(12) United States Patent
Morita et al.

(10) Patent No.: US 8,599,413 B2
(45) Date of Patent: Dec. 3, 2013

(54) IMAGE FORMING APPARATUS

(75) Inventors: Yoshiaki Morita, Kanagawa (JP);
Sohichiroh Ishikawa, Ibaraki (JP);
Tomohide Takenaka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 345 days.

(21) Appl. No.: 13/064,012

(22) Filed: Mar. 2, 2011

(65) Prior Publication Data

US 2011/0228355 A1 Sep. 22, 2011

(30) Foreign Application Priority Data

Mar. 18, 2010 (JP) .................................. 2010-061888
Oct. 8, 2010 (JP) .................................. 2010-228153

(51) Int. Cl.
*H04N 1/04* (2006.01)

(52) U.S. Cl.
USPC .......... 358/1.15; 358/1.13; 358/474; 358/475

(58) Field of Classification Search
USPC ................... 358/1.15, 1.13, 474, 475
See application file for complete search history.

(56) References Cited

U.S. PATENT DOCUMENTS

2010/0128236 A1* 5/2010 Hasebe ........................ 355/35

FOREIGN PATENT DOCUMENTS

| JP | 2004029217 A | 1/2004 |
|---|---|---|
| JP | 2006234862 A | 9/2006 |
| JP | 2009098626 A | 5/2009 |

OTHER PUBLICATIONS

JP 2004-029217 A (Abstract).
JP 2006-234862 A (Abstract).
JP 2009-098626 A (Abstract).

* cited by examiner

*Primary Examiner* — Houshang Safaipour
(74) *Attorney, Agent, or Firm* — Harness, Dickey & Pierce

(57) ABSTRACT

An image forming apparatus includes a latent image carrier having a surface that moves, an optical writing unit that scans and emits light in a main scanning direction, a developing unit, a first storage unit, a second storage unit, and a control unit. The first storage unit stores first light intensity adjustment data for adjusting the intensity of light emitted from the optical writing unit such that the deviation of the emission intensity of the light in the main scanning direction due to characteristics of the optical writing unit is corrected. The second storage unit stores second light intensity adjustment data which can be set at each irradiation point in the main scanning direction and is for adjusting the intensity of the light emitted from the optical writing unit such that the deviation of image density at an arbitrary irradiation point in the main scanning direction is corrected.

14 Claims, 21 Drawing Sheets

FIG. 21A

| AREA | 1 | 2 | 3 | 4 | 5 | 6 | 7 | 8 | 9 |
|---|---|---|---|---|---|---|---|---|---|
| DATA | a1 | a2 | a3 | a4 | a5 | a6 | a7 | a8 | a9 |
| SET VALUE | 54 | 68 | 82 | 96 | 100 | 114 | 128 | 132 | 146 |

▲ REFERENCE

FIG. 21B

| AREA | 1 | 2 | 3 | 4 | 5 | 6 | 7 | 8 | 9 |
|---|---|---|---|---|---|---|---|---|---|
| DATA | a1 | a2 | a3 | a4 | a5 | a6 | a7 | a8 | a9 |
| SET VALUE | 60 | 70 | 80 | 90 | 100 | 105 | 110 | 115 | 120 |

▲ REFERENCE

FIG. 23
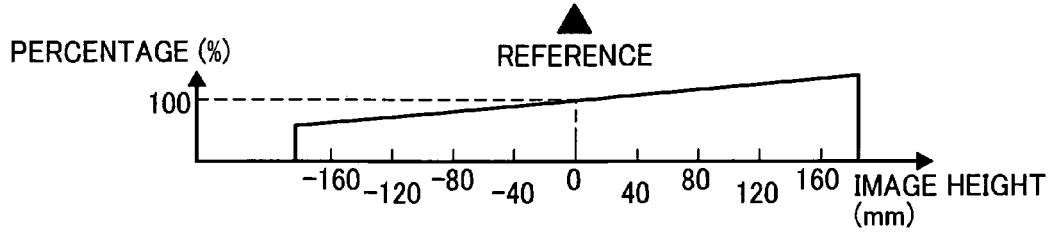
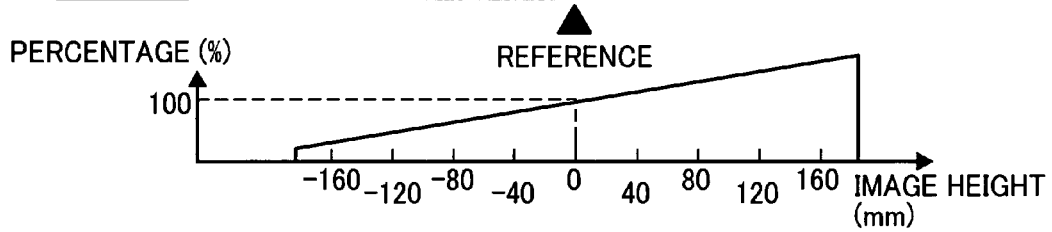
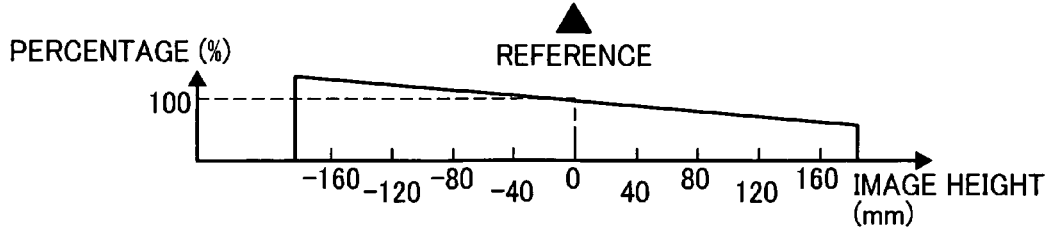
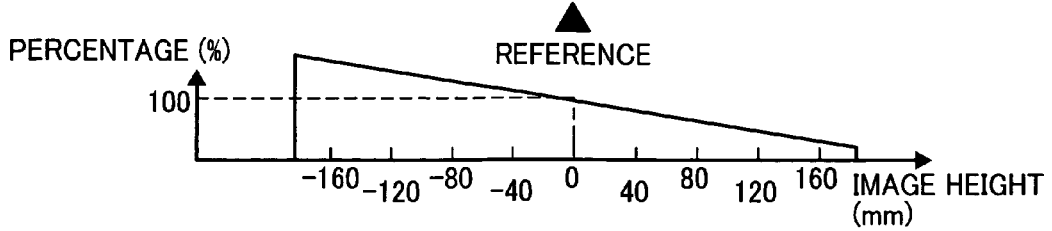

IMAGE FORMING APPARATUS

CROSS-REFERENCE TO RELATED APPLICATIONS

The present application claims priority to and incorporates by reference the entire contents of Japanese Patent Application No. 2010-61888 filed in Japan on Mar. 18, 2010, and Japanese Patent Application No. 2010-228153 filed in Japan on Oct. 8, 2010.

BACKGROUND OF THE INVENTION

1. Field of the Invention

The present invention relates to an image forming apparatus, such as a copier, a facsimile, or a printer, that emits light in a main scanning direction intersecting a direction, in which the surface of a latent image carrier moves, to write a latent image onto the latent image carrier.

2. Description of the Related Art

This type of image forming apparatus according to the related art has a problem in that irregularity in image density (hereinafter, referred to as "the deviation of image density") occurs in the main scanning direction in which scanning is performed with light. The deviation of image density in the main scanning direction occurs, for example, when there is a deviation in the emission intensity of light in the main scanning direction. When there is a deviation in the emission intensity of light in the main scanning direction, the deviation of image density in the main scanning direction occurs in the finally obtained image. For example, in an exposure process, a light beam from a light source in an optical scanning device is emitted in the main scanning direction by a deflector, is guided by an optical element, and is then emitted from the optical scanning device to the surface of a photosensitive drum, which is a carrier. In this case, the deviation of the emission intensity of light in the main scanning direction occurs due to, within the scanning range of light emitted in the main scanning direction, a difference in the incident angle of light on the deflection surface of the deflector or a spatial variation in the reflectance or transmittance of the optical element through which the deflected light passes.

In order to solve the problem of the deviation of the emission intensity of light in the main scanning direction, an image forming apparatus has been proposed which corrects the deviation of the emission intensity of light in the main scanning direction such that a light emission intensity distribution (hereinafter, referred to as a "light intensity distribution") in the main scanning direction becomes uniform or an intended light intensity distribution is obtained (see Japanese Patent Application Laid-open No. 2004-029217, Japanese Patent Application Laid-open No. 2006-234862, and Japanese Patent Application Laid-open No. 2009-0986261). In the image forming apparatus, for example, in the factory, the light intensity distribution of the optical scanning device in the main scanning direction is measured in advance and correction profile data that allows the light intensity distribution to be uniform or an intended light intensity distribution to be obtained is created. The correction profile data is stored in a memory provided in the image forming apparatus and is reflected to the output intensity of light from the optical scanning device. In this way, it is possible to reduce the deviation of image density in the main scanning direction due to the deviation of the emission intensity of light in the main scanning direction.

However, the image forming apparatus according to the related art has a problem in that it is difficult to arbitrarily adjust the deviation of image density in the main scanning direction. For example, in the image forming apparatus disclosed in Japanese Patent Application Laid-open No. 2006-234862, the light intensity distribution in the main scanning direction is adjusted so as to prevent the deviation of image density in the main scanning direction due to the deviation of the emission intensity of light in the main scanning direction. When the adjustment is performed, the capability to form an image is adjusted on the basis of the detection result of the amount of toner adhering in a reference toner image which is formed on the latent image carrier before the latent image of an output image is formed. In the image forming apparatus, it is possible to prevent a deficiency or excess of the toner density of the entire output image due to the adjustment of the light intensity distribution, but it is difficult to arbitrarily adjust the deviation of image density in the main scanning direction.

SUMMARY OF THE INVENTION

It is an object of the present invention to at least partially solve the problems in the conventional technology.

According to an aspect of the present invention, there is provided an image forming apparatus including: a latent image carrier having a surface that moves; an optical writing unit that scans and emits light in a main scanning direction intersecting a direction in which the surface of the latent image carrier moves, thereby writing a latent image to the latent image carrier; a developing unit that develops the latent image of the latent image carrier; a first storage unit that stores first light intensity adjustment data for adjusting the intensity of light emitted from the optical writing unit such that the deviation of the emission intensity of the light in the main scanning direction due to characteristics of the optical writing unit is corrected; a second storage unit that stores, separately from the first light intensity adjustment data, second light intensity adjustment data which can be set at each irradiation point in the main scanning direction and is for adjusting the intensity of the light emitted from the optical writing unit such that the deviation of image density at an arbitrary irradiation point in the main scanning direction is corrected; and a control unit that controls the intensity of the light emitted from the optical writing unit when the light is emitted in the main scanning direction, on the basis of the first light intensity adjustment data stored in the first storage unit and the second light intensity adjustment data stored in the second storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21A is a diagram illustrating a density correction table according to still another embodiment;

FIG. 21B is a diagram illustrating a density correction table according to a comparative example;

FIG. 23 is a diagram illustrating a plurality of density correction tables according to still yet another embodiment.

DETAILED DESCRIPTION OF THE PREFERRED EMBODIMENTS

Figure 1:
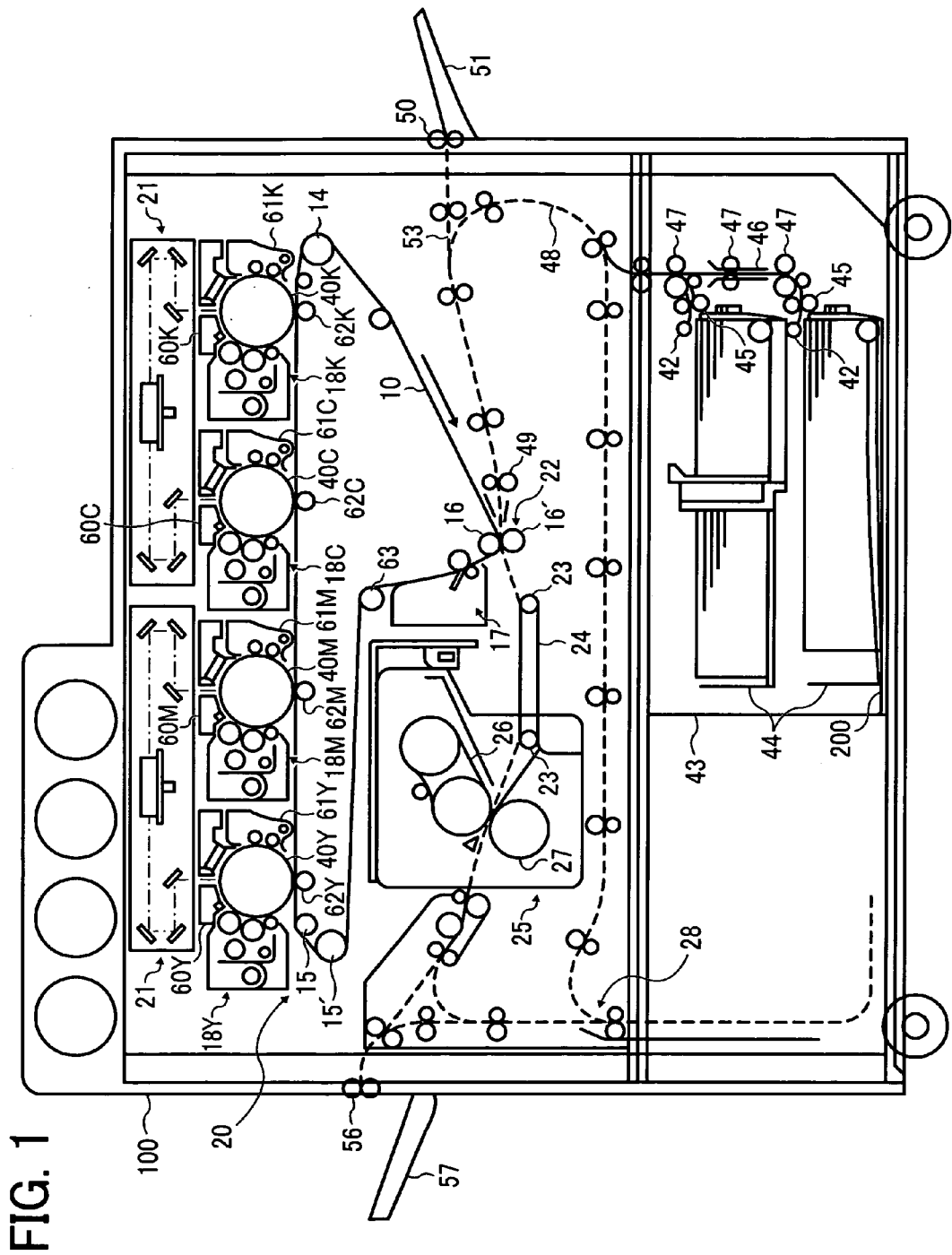
FIG. 1 is a diagram schematically illustrating the structure of an example of an electrophotographic image forming apparatus according to an embodiment of the invention.

Hereinafter, exemplary embodiments of the invention will be described with reference to the accompanying drawings.
Description of Overall Structure of Apparatus FIG. 1 is a diagram schematically illustrating the structure of an example of an electrophotographic image forming apparatus. In FIG. 1, a body 100 of an image forming apparatus, which is a tandem-type and is an intermediate-transfer-type, is mounted on a feed unit (feed table) 200 serving as a recording medium supply unit that stores sheets, which are recording media, and supplies the sheets. In FIG. 1, characters Y, M, C, and K written next to reference numerals indicate yellow, cyan, magenta, and black, respectively.

An intermediate transfer belt 10, which is an endless intermediate transfer belt wound around a plurality of rollers 14, 15, 15', 16, and 63 that support the belt and can be rotated in the clockwise direction in FIG. 1, is provided in the vicinity of the center of the image forming apparatus body 100. In the example shown in FIG. 1, a cleaning device 17 for an intermediate transfer belt is provided on the left side of the supporting roller 16. The cleaning device 17 removes toner remaining on the intermediate transfer belt 10 after an image is transferred. In addition, four (yellow, magenta, cyan, and black) toner image forming units 18Y, 18M, 18C, and 18K are arranged in parallel on the intermediate transfer belt 10 wound around the supporting roller 14 and the supporting roller 15 in the transport direction to form a tandem image forming device 20. As shown in FIG. 1, an optical writing device (exposure device) 21 serving as an optical writing unit is provided above the tandem image forming device 20. The toner image forming units 18Y, 18M, 18C, and 18K of the tandem image forming device 20 include photosensitive drums 40Y, 40M, 40C, and 40K serving as latent image carriers on which yellow, magenta, cyan, and black latent images are formed, respectively. The surfaces of the photosensitive drums 40Y, 40M, 40C, and 40K are uniformly charged by charging devices 60Y, 60M, 60C, and 60K, respectively, and are then exposed by light emitted from the optical writing device (exposure device) 21 on the basis of image data. In this way, latent images are formed on the surfaces of the photosensitive drums 40Y, 40M, 40C, and 40K. The latent images on the photosensitive drums 40Y, 40M, 40C, and 40K are developed by developing devices 61Y, 61M, 61C, and 61K, respectively. In this way, color toner images, which are visible images, are carried onto the surfaces of the photosensitive drums 40Y, 40M, 40C, and 40K. In addition, primary transfer rollers 62Y, 62M, 62C, and 62K, which are components of a primary transfer unit, are provided so as to face the photosensitive drums 40Y, 40M, 40C, and 40K with the intermediate transfer belt 10 interposed therebetween at a primary transfer position where the toner images are transferred from the photosensitive drums 40Y, 40M, 40C, and 40K to the intermediate transfer belt 10. The supporting roller 14 is a driving roller that rotates the intermediate transfer belt 10. When a single black image is formed on the intermediate transfer belt 10, the supporting rollers 15 and 15' other than the driving roller 14 may be moved to separate the yellow, magenta, and cyan photosensitive drums 40Y, 40M, and 40C from the intermediate transfer belt 10.

A secondary transfer device 22 is provided so as to face the tandem image forming device 20 with the intermediate transfer belt 10 interposed therebetween. In the example shown in FIG. 1, in the secondary transfer device 22, a secondary transfer roller 16' comes into pressure contact with the secondary transfer opposite roller 16 to apply a transfer electric field, thereby transferring the image on the intermediate transfer belt 10 to a sheet (not shown) serving as a transfer sheet, which is a recording medium.

A fixing device 25 serving as a fixing unit that fixes the transferred image on the sheet is provided beside the secondary transfer device 22. The fixing device 25 includes a fixing belt 26, which is an endless belt, and a pressure roller 27 that comes into pressure contact with the fixing belt 26. The sheet having the image transferred thereto is transported to the fixing device 25 by a transport belt 24 that is wound around supporting rollers 23 and is rotated.

In the example shown in FIG. 1, a sheet reversing device 28 that reverses the sheet such that images can be formed on both surfaces of the sheet is provided below the secondary transfer device 22 and the fixing device 25 and is arranged in parallel to the tandem image forming device 20.

In the image forming apparatus having the above-mentioned structure, when image data is transmitted to the image forming apparatus body 100 and an image formation start signal is received, a driving motor (not shown) is driven to rotate the supporting roller 14 and the other supporting rollers are rotated with the rotation of the supporting roller 14. In this way, the intermediate transfer belt 10 is rotated. At the same time, the toner image forming units 18Y, 18M, 18C, and 18K form yellow, magenta, cyan, and black images on the photosensitive drums 40Y, 40M, 40C, and 40K, respectively. Then, with the transport of the intermediate transfer belt 10, the primary transfer unit including the primary transfer rollers 62Y, 62M, 62C, and 62K facing the photosensitive drums sequentially transfers the color images to form a combined color image on the intermediate transfer belt 10.

One feed roller 42 of the feed table 200, which is the feed unit, is selectively rotated to feed the sheets from one of feed cassettes 44 which are provided in multiple stages in a paper bank 43, and a separating roller 45 separates the sheets one by one and transports the sheet to a feed path 46. Transport rollers 47 transports the sheet to be guided to a feed path 48 in the image forming apparatus body 100, and the sheet collides with a registration roller 49 and is stopped. Alternatively, a feed roller 50 is rotated to feed the sheets on a manual sheet feed tray 51, and the separating roller separates the sheets one by one. Then, the sheet is transported to a manual sheet feed path 53. Then, similarly, the sheet collides with the registration roller 49 and is then stopped. The registration roller 49 is rotated at the time when the combined color image is formed on the intermediate transfer belt 10 to transport the sheet between the intermediate transfer belt 10 and the secondary transfer roller 16' of the secondary transfer device 22. The secondary transfer device 22 transfers the color image to the sheet. The sheet having the image transferred thereto is transported to the fixing device 25 by the secondary transfer device 22 and the fixing device applies heat and pressure to the sheet to fix the transferred image. Then, a discharge roller 56 discharges the sheet to be stacked on a discharge tray 57. Alternatively, a switching claw (not shown) switches the transport of the sheet such that the sheet is transported into the sheet reversing device 28, and the sheet reversing device 28 reverses the sheet. Then, the sheet is guided to the secondary transfer position again, and an image is formed on the rear surface of the sheet. Then, the sheet is discharged onto the discharge tray 57 by the discharge roller 56.

Figure 2:
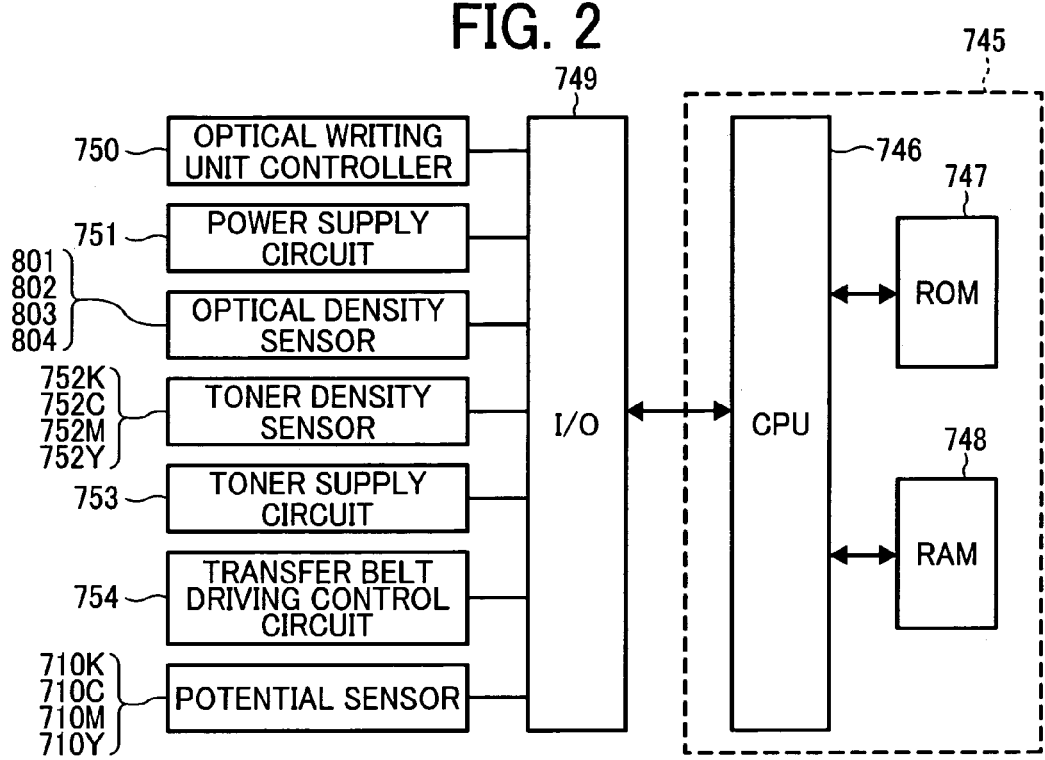
FIG. 2 is a block diagram schematically illustrating the structure of electric and electronic equipment in the image forming apparatus.

After the image is transferred, the cleaning device 17 for an intermediate transfer belt removes toner remaining on the intermediate transfer belt 10, and the tandem image forming device 20 is ready to form an image. Description of electric and electronic equipment FIG. 2 is a block diagram schematically illustrating the structure of electric and electronic equipment of the image forming apparatus according to this embodiment. The electric and electronic equipment includes a main control unit 745 serving as a control unit and a plurality of peripheral control units. The main control unit 745 includes a main CPU 746, a read only memory (ROM) 747 serving as a storage unit that stores a control program and various kinds of data, and a RAM 748, which is a data rewritable memory serving as a storage unit which is a work area and temporarily stores various kinds of data. The main control unit 745 is connected to, for example, an optical writing unit controller 750, a power supply circuit 751, optical density sensors 801, 802, 803, and 804 serving as image density detecting units, toner density sensors 752K, 752C, 752M, and 752Y serving as toner density detecting units, a toner supply circuit 753, an intermediate transfer belt driving control circuit 754, and potential sensors 710K, 710C, 710M, and 710Y through an I/O interface unit 749 for transmitting or receiving signals to or from each peripheral control unit. The optical writing unit controller 750 controls an optical writing unit forming the optical writing device 21 on the basis of a command input from the main control unit 745 through the I/O interface unit 749. The power supply circuit 751 applies a high voltage to each of the charging devices 60K, 60Y, 60M, and 60C serving as charging units that uniformly charge the toner image forming units 18K, 18Y, 18M, and 18C and applies a development bias to each of the developing rollers, which are developer carriers of the developing devices 61K, 61Y, 61M, and 61C serving as developing units of the toner image forming units 18K, 18Y, 18M, and 18C, on the basis of the commands input from the main control unit 745 through the I/O interface unit 749. The toner density sensors 752K, 752C, 752M, and 752Y are attached to the developing devices 61K, 61Y, 61M, and 61C of each color and detect the toner density of a two-component developer stored in each of the developing devices 61K, 61Y, 61M, and 61C. The toner supply circuit 753 controls toner supply motors of the toner supply units of each color and controls the supply of toner from toner bottles of each color to the two-component developer stored in each of the developing devices 61K, 61Y, 61M, 61C, on the basis of the command input from the main control unit 745 through the I/O interface unit 749. The main control unit 745 outputs a command to set the toner density of the two-component developer in the developing devices 61K, 61Y, 61M, and 610 to a reference level to the toner supply circuit 753 through the I/O interface unit 749, on the basis of values output from the toner density sensors 752K, 752C, 752M, and 752Y for each color. The intermediate transfer belt driving control circuit 754 controls the driving of a driving motor for rotating the intermediate transfer belt 10 on the basis of the command input from the main control unit 745 through the I/O interface unit 749.

Figure 3:
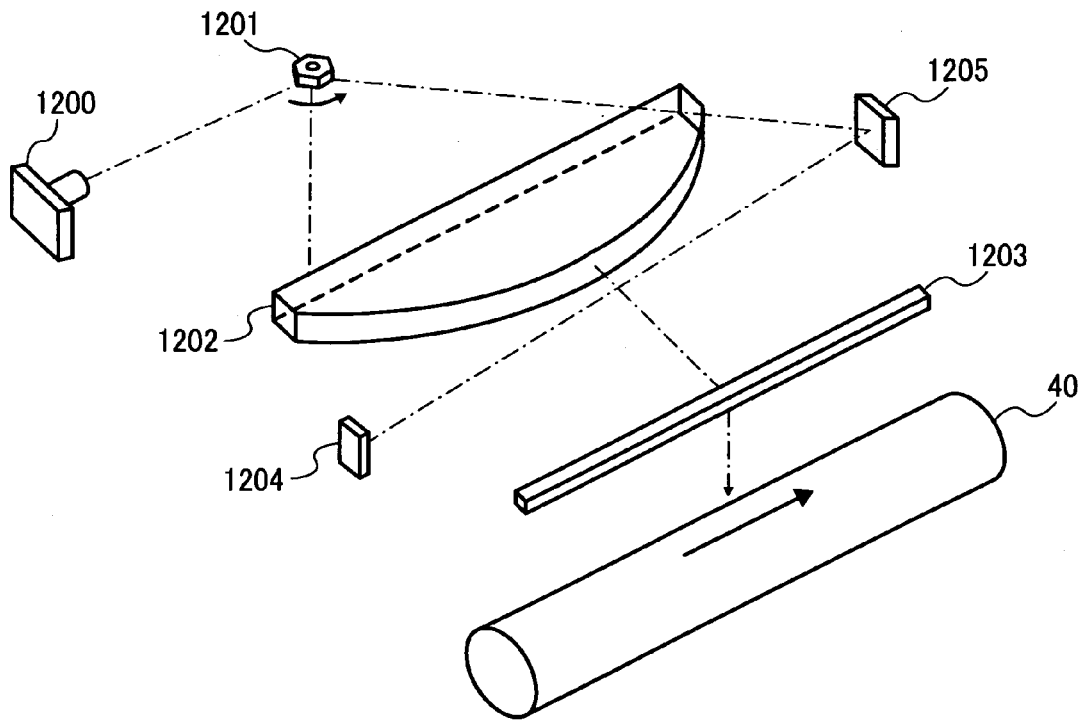
FIG. 3 is a perspective view illustrating an example of the structure of an optical scanning device forming an optical writing device of the image forming apparatus.

FIG. 3 is a perspective view illustrating an example of the structure of an optical scanning device forming the optical writing device 21. A semiconductor laser (hereinafter, referred to as a "laser") 1200 is an example of a light source. The laser 1200 functions as a laser beam emitting unit that emits a beam (laser beam) on the basis of a video signal from a video controller (not shown) or a control signal from an engine controller (not shown).

A polygon mirror 1201 is an example of a rotating polygon mirror. The polygon mirror 1201 is rotated in the direction of an arrow in FIG. 3 by a motor (not shown) and performs scanning while reflecting the beam from the laser 1200. The motor (not shown) for rotating the polygon mirror 1201 is controlled so as to be rotated at a constant speed by an acceleration signal/a deceleration signal from the engine controller (not shown). The beam emitted from the laser 1200 is reflected by a reflecting surface of the polygon mirror 1201, travels through an fθ lens 1202 and a reflection mirror 1203, and scans the photosensitive drum 40 in the direction of the arrow. The fθ lens 1202 is an optical component for scanning the photosensitive drum 40 with the beam at a constant speed. A beam detector (hereinafter, referred to as a "BD") 1204 serving as an optical detecting unit is an element that detects a light beam and converts the light beam into a voltage. A beam reflected from a mirror 1205 that is provided on a beam scanning path is incident on the BD 1204 at predetermined timing. The BD 1204 generates a BD signal on the basis of the voltage generated by the incident light and outputs a BD signal to a CPU or a logic circuit of the engine controller (not shown). The BD signal is used as a horizontal synchronization signal.

Figure 4:
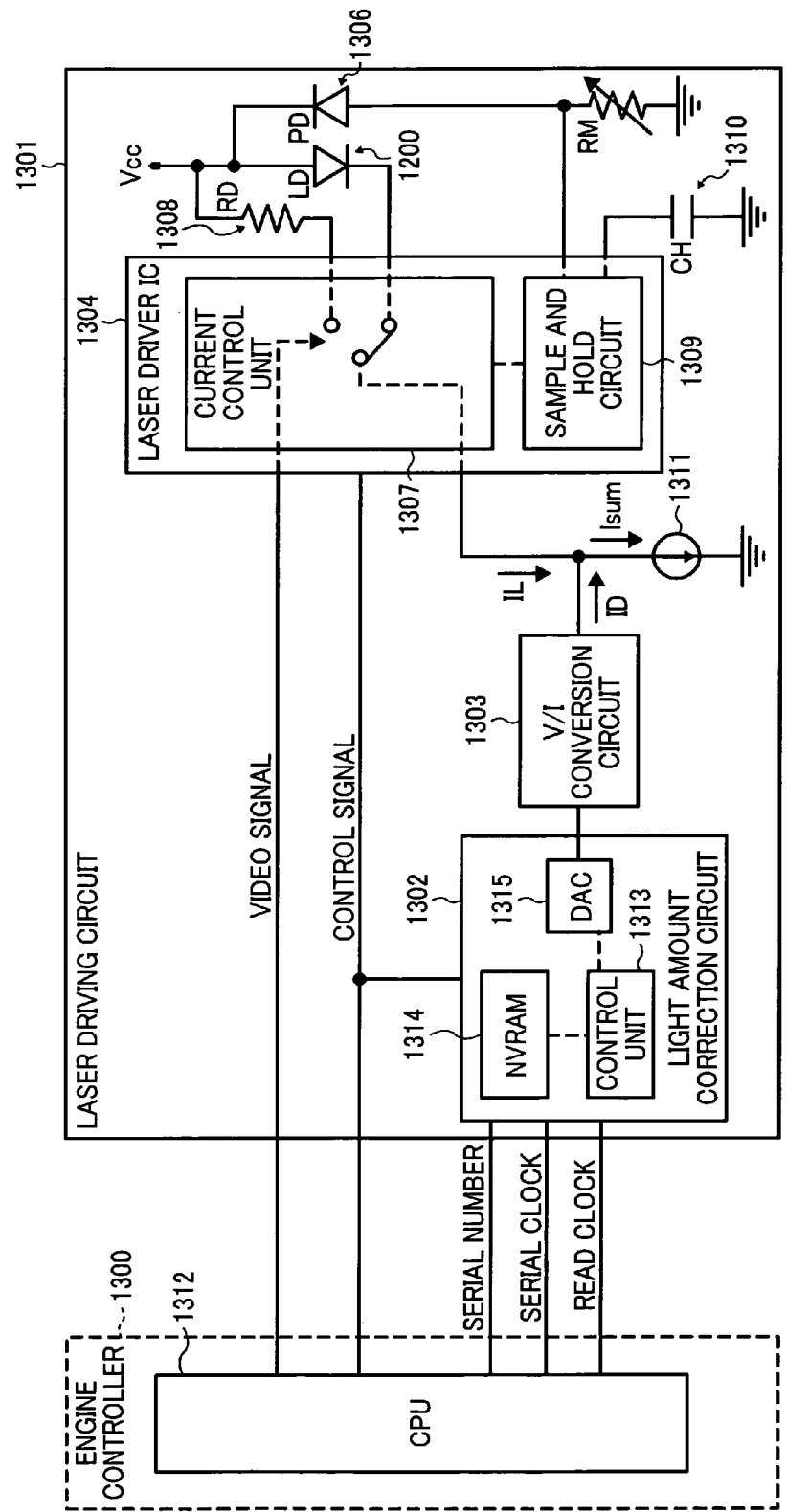
FIG. 4 is a block diagram illustrating an example of the structure of a laser driving circuit and an engine controller related to controlling the correction of the amount of light.

FIG. 4 is a block diagram illustrating an example of the structure of a laser driving circuit and the engine controller related to controlling the correction of the amount of light. An engine controller 1300 is a control unit including a CPU 1312. A laser driving circuit 1301 includes a light amount correction circuit 1302, a V/I conversion circuit 1303, a laser driver IC 1304, the laser 1200, and a photodiode 1306. A current control unit 1307 of the laser driver IC 1304 switches an operation of supplying a current to the laser 1200 to emit light on the basis of a video signal and an operation of supplying a current to a dummy resistor 1308 to turn off the laser 1200.

Next, sampling control will be described. Sampling control is performed at the time of startup of a laser exposure device or whenever each scanning operation for forming an image is performed. When the laser 1200 is turned on and emits beams, some of the beams emitted from the laser 1200 are incident on the photodiode 1306. In this case, a photocurrent that is proportional to the amount of light emitted from the laser 1200 is output by the photodiode 1306 and is then input to a sample-and-hold circuit 1309. The value of the photocurrent is sampled by the sample-and-hold circuit 1309 and is then output to the current control unit 1307. The current control unit 1307 compares the signal output from the sample-and-hold circuit 1309 with the amount of necessary light. When the output signal (the amount of light emitted) is less than the amount of necessary light, the current control unit 1307 increases the amount of driving current to the laser. On the other hand, when the amount of light emitted is more than the amount of necessary light, the current control unit 1307 performs control to reduce a laser current. When the amount of laser beam is equal to a predetermined amount of light emitted, the sample-and-hold circuit 1309 is held. In this case, when the output value is held as a voltage value in a capacitor 1310 connected to the sample-and-hold circuit 1309, the laser 1200 can emit a predetermined amount of light for each scanning operation. A current Isum flowing to a constant current circuit 1311 is set by the V/I conversion circuit 1303 such that the amount of light detected by the photodiode 1306 is equal to a predetermined value. A control unit 1313 of the light amount correction circuit 1302 is connected to the CPU 1312 of the engine controller 1300 by serial communication. The CPU 1312 of the engine controller 1300 transmits information, such as the print mode, to the control unit 1313 of the light amount correction circuit 1302. The light amount correction circuit 1302 includes an NVRAM 1314, which is a non-volatile memory serving as a first storage unit and a second storage unit, and stores correction profile data based on the light amount profile of each beam. The correction profile stores a laser current correction value at the scanning position of each beam when the scanning length of the beam on the surface of the photosensitive drum is divided by a predetermined value. After a predetermined period of time has elapsed from the input of a control signal from the CPU 1312 in synchronization with the BD signal, the control unit 1313 of the light amount correction circuit 1302 starts to read the current correction value of the correction profile stored in the NVRAM 1314. The read timing is a read clock output from the CPU 1312 of the engine controller 1300. The frequency of the read clock is determined by the division number of the beam scanning length. The control unit 1313 of the light amount correction circuit 1302 controls a D/A converter 1315 of the light amount correction circuit 1302 to convert the current correction value of the read correction profile into a predetermined analog voltage value. The analog voltage output from the light amount correction circuit 1302 is converted into a correction current ID by the V/I conversion circuit 1303 and then is input to the constant current circuit 1311. A laser current IL is obtained by subtracting the correction current ID output from the light amount correction circuit 1302 from the set current Isum flowing to the constant current circuit 1311.

Figure 5:
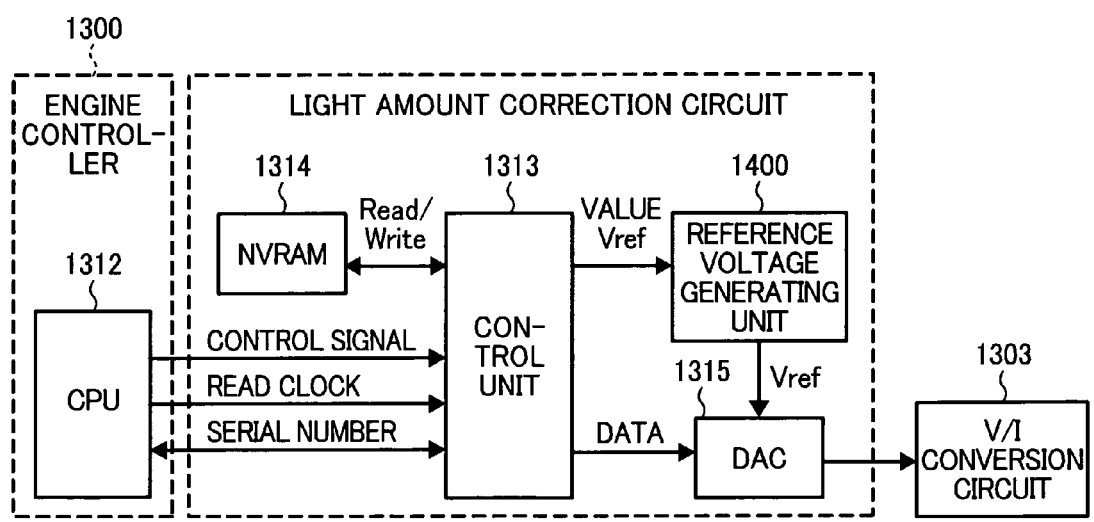
FIG. 5 is a block diagram illustrating the detailed structure of a light amount correction circuit.

FIG. 5 is a block diagram illustrating the detailed structure of the light amount correction circuit 1302. The NVRAM 1314 is a non-volatile memory. The control unit 1313 includes a logic circuit. The D/A converter 1315 converts multiple-valued data read from the NVRAM 1314 into an analog voltage and outputs the analog voltage. The V/I conversion circuit 1303 converts the analog voltage output from the D/A converter into a current. The CPU 1312 is a circuit that has a central role in the control of the engine controller. The control unit 1313 is connected to the NVRAM 1314. The control unit 1313 can read/write data from/to the NVRAM 1314. The CPU 1312 reads/writes data from/to the NVRAM 1314 by serial communication with the control unit 1313. The control unit 1313 reads a reference value Vref (the reference voltage of the D/A converter 1315) stored in the NVRAM 1314 and sets the value Vref to a reference voltage generating unit 1400. The reference voltage generating unit 1400 outputs a voltage corresponding to the value Vref as a reference voltage to the D/A converter 1315. The control unit 1313 reads correction profile data from the NVRAM 1314 using the control signal that is synchronized with the BD signal received from the CPU 1312 of the engine controller as a trigger signal and sets the read data to the D/A converter 1315. The D/A converter 1315 outputs a voltage value obtained by multiplying the voltage corresponding to the value Vref by the correction profile data to the V/I conversion circuit 1303.

Figure 6:
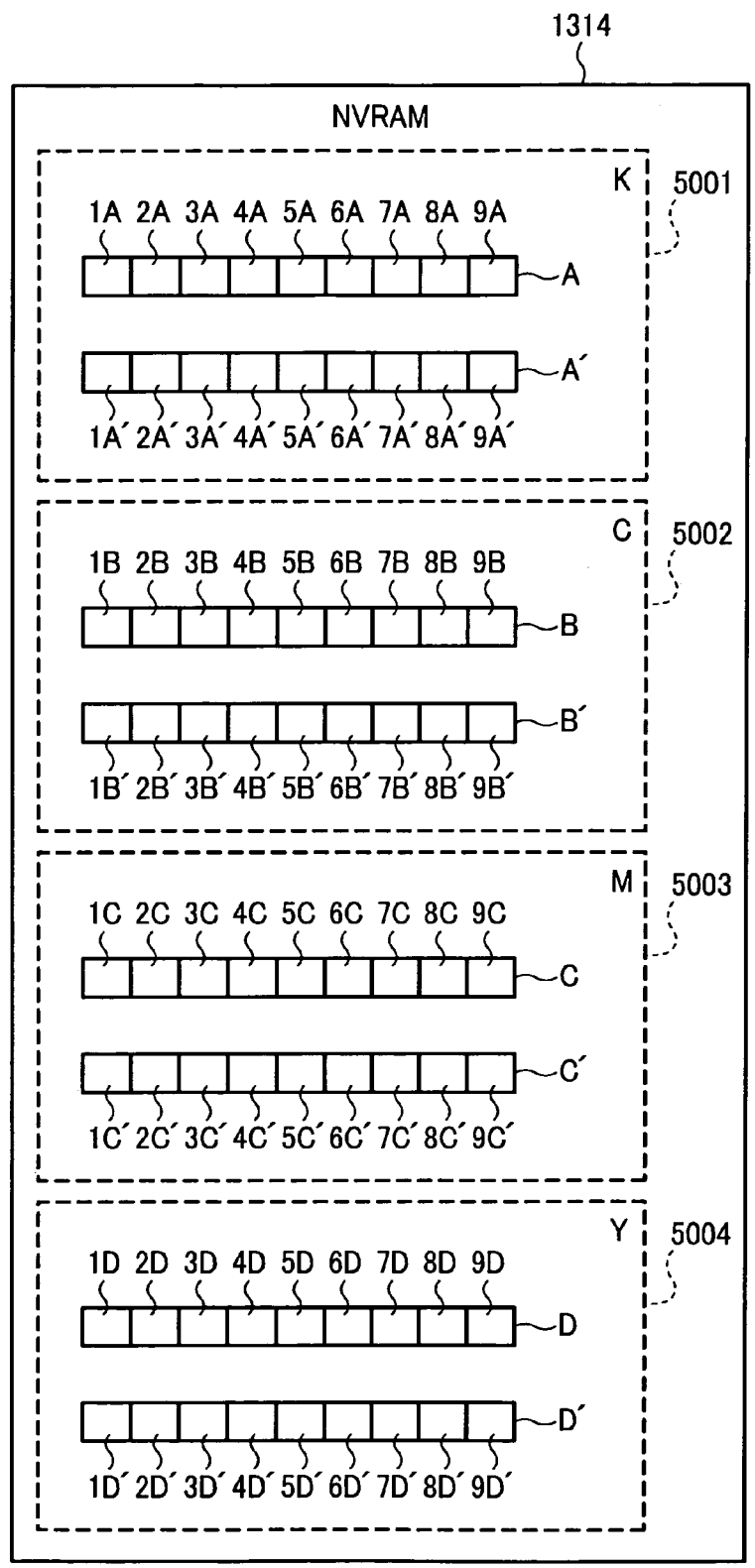
FIG. 6 is a block diagram schematically illustrating the internal structure of an NVRAM in the light amount correction circuit.

FIG. 6 is a block diagram schematically illustrating the internal structure of the NVRAM 1314 in the light amount correction circuit. The NVRAM 1314 includes a K block 5001, a C block 5002, an M block 5003, and a Y block 5004 that respectively store K (black), C (cyan), M (magenta), and Y (yellow) correction profile data. Each of the C block 5002, the M block 5003, and the Y block 5004 has the same structure as the K block 5001. Therefore, the K block 5001 will be described below.

The K block 5001 includes a K light amount correction table A that stores first light intensity adjustment data for correcting a light beam intensity distribution in the main scanning direction caused by the characteristics of the optical writing device 21 and a K density correction table A' that stores second light intensity adjustment data for arbitrarily adjusting the deviation of image density in the main scanning direction. A plurality of areas set in the K light amount correction table A corresponds to the positions of K in the main scanning direction. In FIG. 6, the K light amount correction table A includes nine equally divided areas 1A to 9A. In this embodiment, the K light amount correction table A is divided into 9 areas for convenience of description, but the number of divisions is not limited to nine. It is preferable that the number of divisions be as large as possible. This is because a gradation property after correction is improved as the number of divisions increases. Similarly, a plurality of areas set in the K density correction table A' corresponds to the positions of K in the main scanning direction. In FIG. 6, the K density correction table A' includes nine equally divided areas 1A' to 9A'. It is preferable that the number of areas divided in the K light amount correction table A be equal to that in the K density correction table A' and the main scanning position in the K light amount correction table A be aligned with that in the K density correction table A'. However, when the correspondence therebetween is clear, the number of divisions and the positional relationship are not limited thereto. The internal structure of the NVRAM 1314 has been described above with reference to FIG. 6, and the positional relationship between the areas 1A to 9A or the areas 1A' to 9A' in the main scanning direction will be described below.

For example, the user of the image forming apparatus or the operator who maintains the image forming apparatus can operate an input unit, such as an operation panel provided in the image forming apparatus, to rewrite the first light intensity adjustment data of the light amount correction table A and the second light intensity adjustment data of the density correction table A' stored in the NVRAM 1314. In addition, an external apparatus, such as a computer that can communicate with the image forming apparatus through a communication network, may rewrite the first light intensity adjustment data and the second light intensity adjustment data in the NVRAM 1314. The density correction table A' may be set by the sense of the operator who views an output image. Alternatively, an image reading device, such as a scanner provided in the image forming apparatus, may read an output image and set the density correction table A' on the basis of the read result (for example, the deviation of the density of the output image in the main scanning direction). In addition, an inspection device that inspects the quality of an output image may be provided separately from the image forming apparatus, and the density correction table A' may be set on the basis of the inspection result of the inspection device (for example, the deviation of the density of the output image in the main scanning direction).

Figure 7:
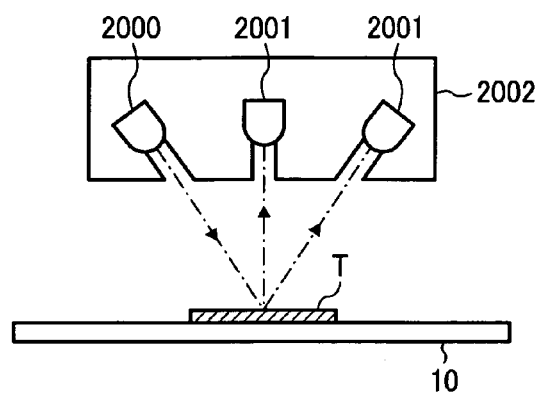
FIG. 7 is a diagram illustrating an example of the structure of an optical density sensor.

FIG. 7 is a diagram illustrating an example of the structure of the optical density sensor serving as an image density detecting unit. For example, the optical density sensor is provided so as to face the driving roller 14 in FIG. 1. The optical density sensor includes a light emitting element 2000, such as an LED (light emitting diode), a light receiving element 2001, such as a photodiode or CdS, and a holder 2002 that holds the elements. The light emitting element 2000 emits light to a reference toner image T (hereinafter, referred to as a "patch", if needed) for image density control which is formed on the intermediate transfer belt 10 and the light receiving element 2001 receives light that is specularly reflected and diffusely reflected from the reference toner image T. In this way, the density of the patch is measured.

Figure 8:
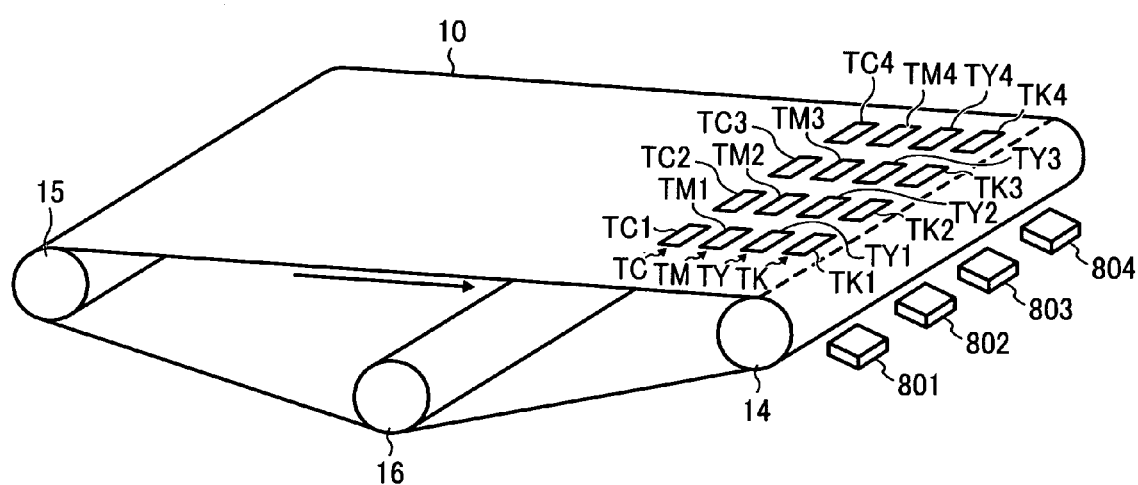
FIG. 8 is a perspective view illustrating an example of the positional relationship between each optical density sensor and reference toner images of each color formed on an intermediate transfer belt.

FIG. 8 is a perspective view illustrating an example of the positional relationship between the reference toner images of each color formed on the intermediate transfer belt 10 and the optical density sensors in the image forming apparatus according to this embodiment. In FIG. 8, the endless intermediate transfer belt 10 is rotated in the clockwise direction. The first optical density sensor 801, the second optical density sensor 802, the third optical density sensor 803, and the fourth optical density sensor 804 are provided on the right side of the intermediate transfer belt 10. Each of the first to fourth density sensors is a reflective type. The optical density sensors 801 to 804 are arranged at predetermined pitches in the width direction of the intermediate transfer belt 10, that is, in a direction parallel to the main scanning direction. The optical density sensors 801 to 804 face a portion of the intermediate transfer belt 10 wound around the supporting roller 14 with a predetermined gap therebetween. The first optical density sensor 801 emits light to the vicinity of one end of the intermediate transfer belt 10 in the width direction, and a light receiving element (not shown) receives reflected light and outputs a voltage corresponding to the amount of reflected light. The amount of reflected light varies depending on the light reflectance of the intermediate transfer belt 10. The light reflectance of the intermediate transfer belt 10 varies depending on the amount of toner adhered per unit area in each of the reference toner images TC1, TM1, TY1, and TK1 formed on the surface of the belt. Therefore, the first optical density sensor 801 functions as a toner adhesion amount detecting unit that detects the amount of toner adhered per unit area in each of the reference toner images TC1, TM1, TY1, and TK1 formed in the vicinity of one end of the intermediate transfer belt in the width direction. Similarly, the fourth optical density sensor 804 detects the amount of toner adhered per unit area in each of the reference toner images TC4, TM4, TY4, and TK4 formed in the vicinity of the other end of the intermediate transfer belt in the width direction. In addition, the second optical density sensor 802 and the third optical density sensor 803 detect the amount of toner adhered per unit area in each of the reference toner images TC2, TM2, TY2, TK2, TC3, TM3, TY3, and TK3 formed in the vicinity of the center of the intermediate transfer belt 10.

The detection result of each of the optical density sensors 801 to 804 can be used for the image density adjusting process of each of the toner image forming units 18Y, 18M, 18C, and 18K. For example, the image density of the C toner image forming unit 18C is adjusted on the basis of the detection result of the amount of toner adhered in at least one of the cyan reference toner images TC1, TC2, TC3, and TC4 formed on the surface of the intermediate transfer belt 10. Similarly, the image density of the M toner image forming unit 18M is adjusted on the basis of the detection result of the amount of toner adhered in at least one of the magenta reference toner images TM1, TM2, TM3, and TM4 formed on the surface of the intermediate transfer belt 10, and the image density of the Y toner image forming unit 18Y is adjusted on the basis of the detection result of the amount of toner adhered in at least one of the yellow reference toner images TY1, TY2, TY3, and TY4 formed on the surface of the intermediate transfer belt 10. The image density of the K toner image forming unit 18K is adjusted on the basis of the detection result of the amount of toner adhered in at least one of the black reference toner images TK1, TK2, TK3, and TK4 formed on the surface of the intermediate transfer belt 10.

The detection result of each of the optical density sensors 801 to 804 may be used to set the data of the density correction table in a process of adjusting light intensity in the main scanning direction. For example, the optical density sensors 801 to 804 detect the amount of toner adhered in the black reference toner images TK1, TK2, TK3, and TK4 formed on the surface of the intermediate transfer belt 10, the deviation of black image density in the main scanning direction is determined on the basis of the detection result, the deviation of the black image density is corrected, and data in each area of the K density correction table A' is set such that predetermined image density (for example, constant image density) is obtained in each area in the main scanning direction. Similarly, the optical density sensors 801 to 804 detect the amount of toner adhered in the cyan reference toner images TC1, TC2, TC3, and TC4 formed on the surface of the intermediate transfer belt 10, the deviation of cyan image density in the main scanning direction is determined on the basis of the detection result, the deviation of the cyan image density is corrected, and data in each area of a C density correction table B' is set such that predetermined image density (for example, constant image density) is obtained in each area in the main scanning direction. In addition, for magenta and yellow, the deviation of magenta and yellow image density in the main scanning direction is -determined on the basis of the detection result of the magenta and yellow reference toner images, the deviation of the magenta and yellow image density is corrected, and data in each area of an M density correction table C' and a Y density correction table D' is set such that predetermined image density (for example, constant image density) is obtained in each area in the main scanning direction.

Figure 9:
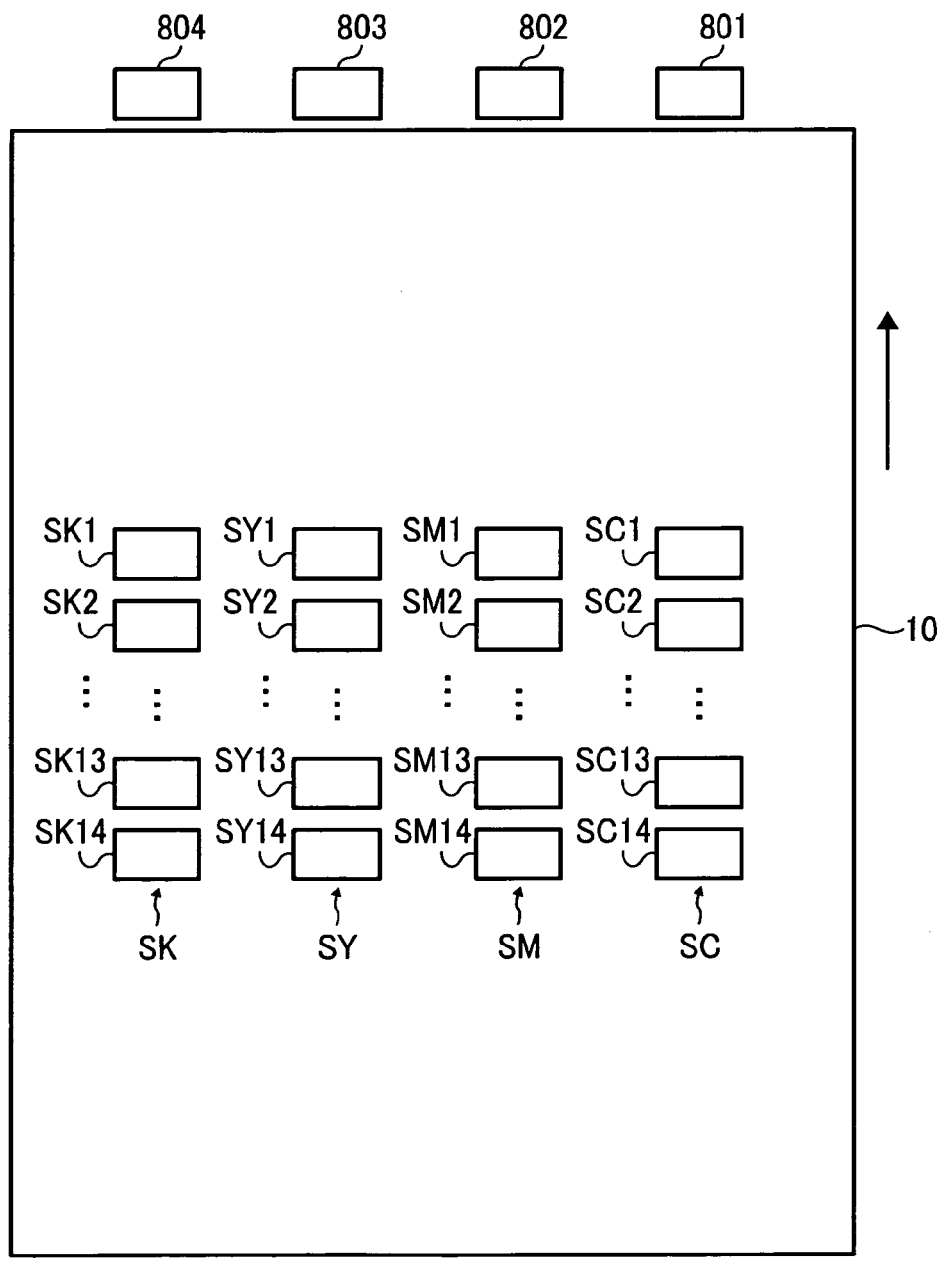
FIG. 9 is a plan view schematically illustrating another example of the positional relationship between each optical density sensor and the reference toner images of each color formed on the intermediate transfer belt.

FIG. 9 is a plan view schematically illustrating another example of the positional relationship between the reference toner images formed on the intermediate transfer belt 10 and the optical density sensors. As shown in FIG. 9, in the image density adjusting process, a K reference toner image group SK including fourteen K reference toner images SK1, SK2, ..., SK13, and SK14 that are arranged at predetermined pitches in the moving direction (sub-scanning direction) of the intermediate transfer belt 10 is formed. In addition, a Y reference toner image group SY including fourteen Y reference toner images SY1, SY2, ..., SY13, and SY14 that are arranged at predetermined pitches in the sub-scanning direction is formed so as to be adjacent to the K reference toner image group SK in the main scanning direction. An M reference toner image group SM including fourteen M reference toner images SM1, SM2, ..., SM13, and SM14 that are arranged at predetermined pitches in the sub-scanning direction is formed so as to be adjacent to the Y reference toner image group SY in the main scanning direction. A C reference toner image group SC including fourteen C reference toner images SC1, SC2, ..., SC13, and SC14 that are arranged at predetermined pitches in the sub-scanning direction is formed so as to be adjacent to the M reference toner image group SM in the main scanning direction. The fourth optical density sensor 804 detects the amount of toner adhered in each of the K reference toner images in the K reference toner image group SK, and the average value of a plurality of detected data items is calculated. The image density of the K toner image forming unit 18K is adjusted on the basis of the average value of the detected data, as described above. The third optical density sensor 803 detects the amount of toner adhered in each of the Y reference toner images in the Y reference toner image group SY, and the average value of a plurality of detected data items is calculated. The image density of the Y toner image forming unit 18Y is adjusted on the basis of the average value of the detected data, as described above. The second optical density sensor 802 detects the amount of toner adhered in each of the M reference toner images in the M reference toner image group SM, and the average value of a plurality of detected data items is calculated. The image density of the M toner image forming unit 18M is adjusted on the basis of the average value of the detected data, as described above. The first optical density sensor 801 detects the amount of toner adhered in each of the C reference toner images in the C reference toner image group SC, and the average value of a plurality of detected data items is calculated. The image density of the C toner image forming unit 18C is adjusted on the basis of the average value of the detected data, as described above.

Figure 10:
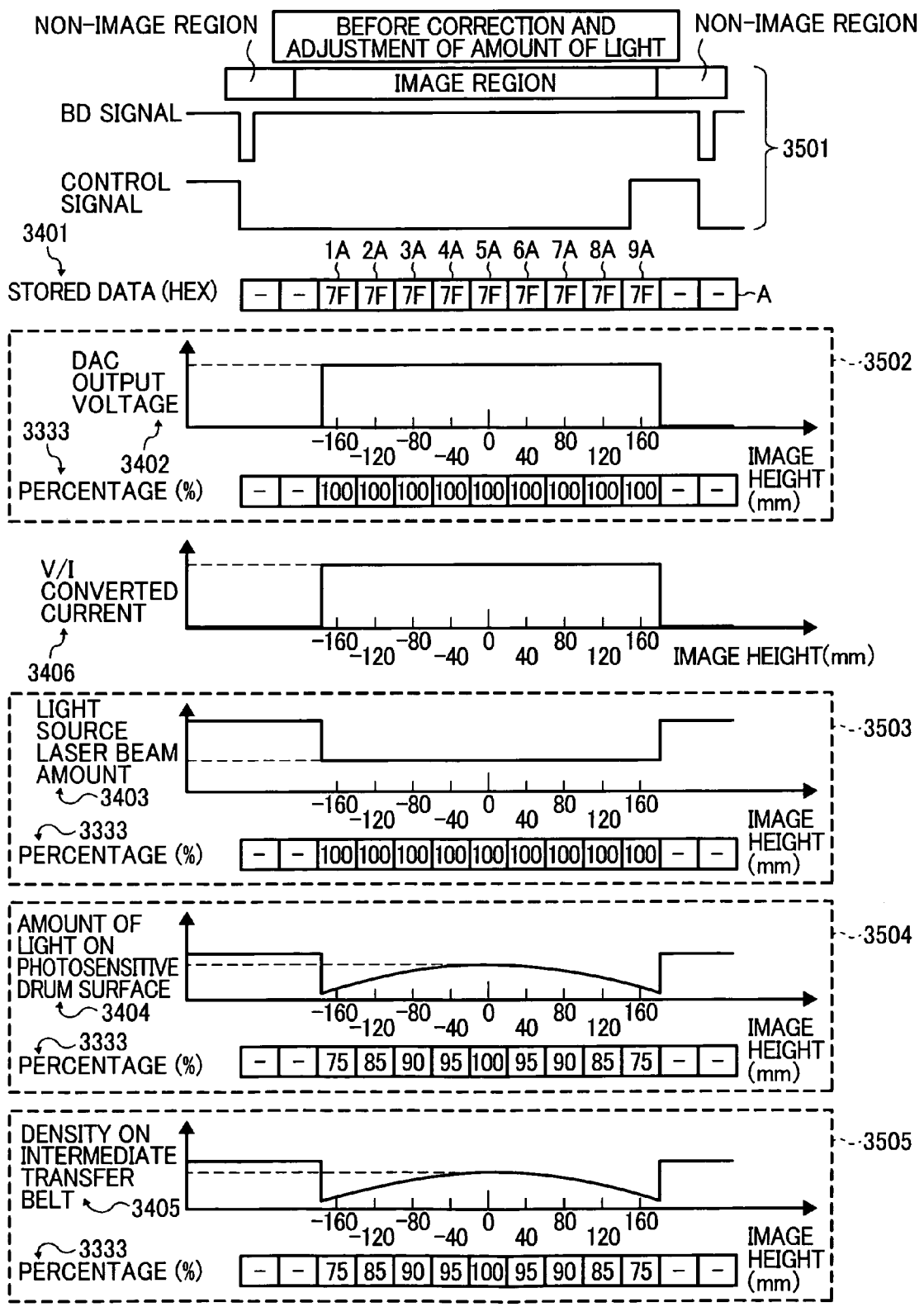
FIG. 10 is a diagram illustrating the flow of a process and a timing chart illustrating the relationship between a position in the main scanning direction and the stored data of a light amount correction table A before the correction and adjustment of the amount of light in the main scanning direction is controlled.

FIG. 10 is a diagram illustrating the flow of a process and a timing chart illustrating the relationship between the position in the main scanning direction and stored data 3401 of the light amount correction table A in the NVRAM 1314 before the correction and adjustment control of the amount of light in the main scanning direction is performed. In FIG. 10, the horizontal direction is the main scanning direction of a print image. The stored data 3401 shown at the upper part of FIG. 10 is a number (7Fh in the example shown in FIG. 10) stored in the areas 1A to 9A of the light amount correction table A. FIG. 10 illustrates the flow of a process from the upper part toward the lower part. In this embodiment, the stored data 3401 in each area is represented by 2 bytes (hexadecimal number). A percentage 3333 indicates the percentage of the output of another area in an image region with respect to the value (decimal number) of the area 5A, that is, the percentage (%) of a relative value (decimal number) obtained by dividing the value of each area by the value of the area 5A.

A timing chart 3501 at the uppermost side of FIG. 10 shows the relationship between a non-image region and an image region and the relationship between the BD signal and the control signal in time series. The control signal is generated by the BD signal and a signal for forming an image in the image region is output.

A DAC output voltage graph 3502 in FIG. 10 shows the relationship between an image height and a DAC output voltage 3402 at the image height. The term "image height" means the distance (height) "mm" from the center of the image region to the center of each area in the main scanning direction. In FIG. 10, the right direction is represented by a positive value and the left direction is represented by a negative value. The operation of the light amount correction circuit 1302 is performed as follows. The control unit 1313 shown in FIG. 5 reads the correction profile data (first light intensity adjustment data) stored in the light amount correction table A of the NVRAM 1314. For example, the control unit 1313 reads 2-byte correction profile data 7Fh from a central portion or a substantially central portion of the image and sets the read data to the D/A converter 1315. In this embodiment, the correction profile data determines a correction current value at the position in the main scanning direction. When the correction profile data is 7Fh, which is the maximum, the reference voltage generating unit 1400 outputs a voltage corresponding to the value Vref that is predetermined such that the correction current ID is 50% of Isum. The D/A converter 1315 outputs a voltage value 3402 obtained by multiplying the voltage corresponding to the value Vref output from the reference voltage generating unit 1400 by the correction profile data to the V/I conversion circuit 1303, thereby generating the correction current ID. In this case, the correction current ID is 50% of Isum. When the correction profile data is FFh, the correction current ID is 100% of Isum since the correction profile data is 2 bytes. When the correction profile data is 00h, the correction current ID is 0 mA. The laser driving current IL obtained by subtracting a V/I converted current 3406 (correction current ID) output from the V/I conversion circuit 1303 from the set current Isum is supplied to the LD 1200 serving as a light source through the laser driver IC 1304 shown in FIG. 4. In this way, as shown in a light source laser beam amount graph 3503, the LD 1200 emits a laser beam with a light source laser beam amount 3403 corresponding to the correction profile data.

The laser beam emitted from the laser 1200, which is an example of the light source, passes the polygon mirror 1201 or the fθ lens 1202 and the amount of light is reduced. The reduction in the amount of light is more noticeable at a peripheral image height (±160 mm) than at a central image height (about 0 mm). The amount of light (hereinafter, referred to as "the amount of light on a photosensitive drum surface") on the surface of the photosensitive drum 40 is generally shown in a graph 3504 for the amount of light on the photosensitive drum surface. A graph 3505 for density on the intermediate transfer belt shows toner density (hereinafter, referred to as "density on the intermediate transfer belt") 3405 on the intermediate transfer belt under ideal conditions that the amount of charge on the surface of the photosensitive drum 40, the development capability of the developing device 61, and the transfer efficiency of the toner image on the photosensitive drum 40 to the intermediate transfer belt 10 are all uniform in the main scanning direction. The correction and adjustment of the amount of light are needed in order to uniformly distribute the amount 3404 of light on the photosensitive drum surface and density 3405 on the intermediate transfer belt in the main scanning direction and to achieve the density of the print image in the main scanning direction.

Figure 11:
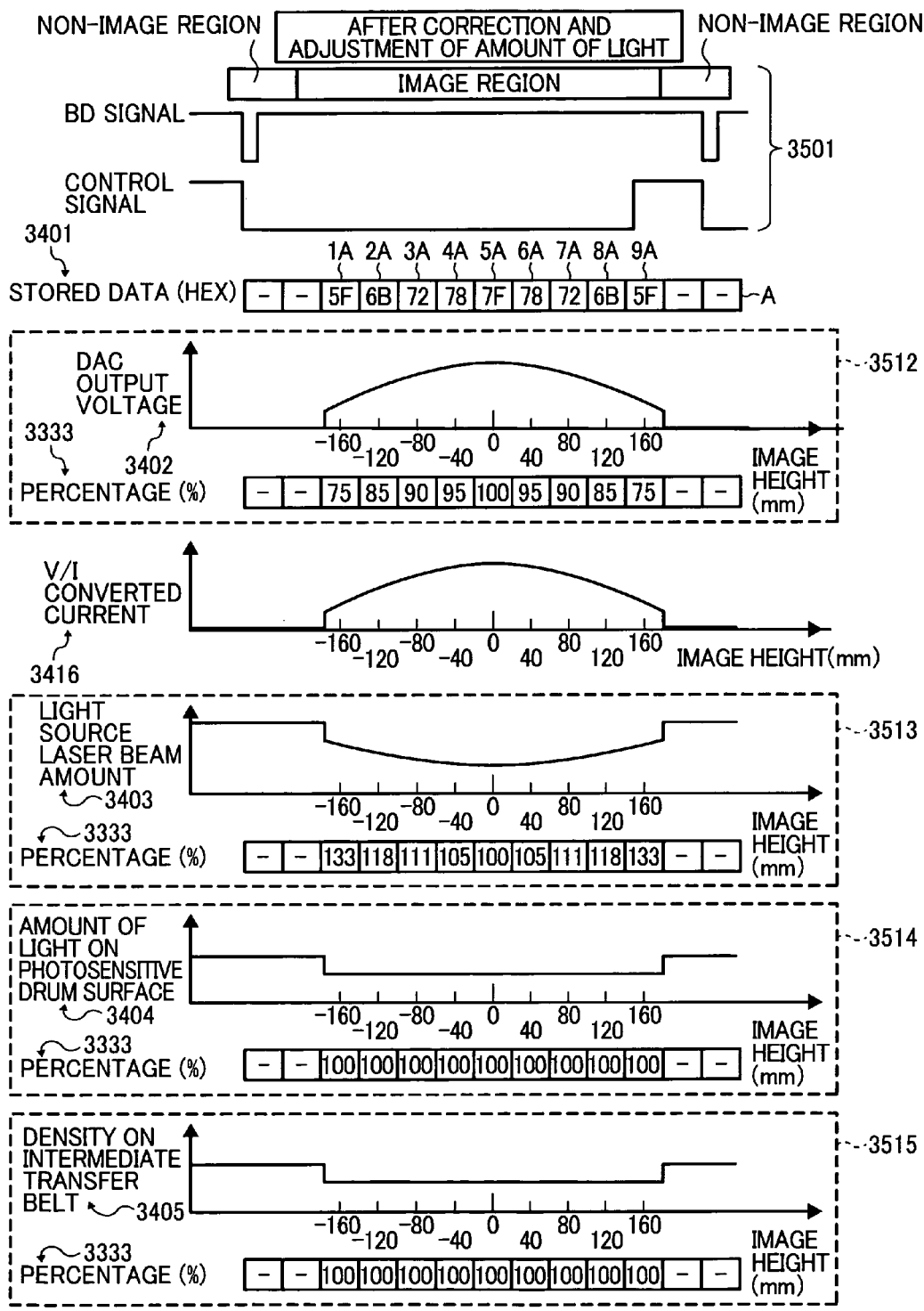
FIG. 11 is a diagram illustrating the flow of a process and a timing chart illustrating the relationship between a position in the main scanning direction and the stored data of the light amount correction table A when the correction and adjustment of the amount of light in the main scanning direction is controlled.

FIG. 11 is a diagram illustrating the flow of a process and a timing chart illustrating the relationship between the position in the main scanning direction and the stored data of the light amount correction table A in the NVRAM 1314 when the correction and adjustment control of the amount of light in the main scanning direction is performed. Before FIG. 11 is described, a process of creating the correction profile data that is needed to correct and adjust the amount of light and is used to control a laser driving current will be described. First, for example, in the factory, the amount of light on the photosensitive drum surface is measured in the main scanning direction at several points by a single optical writing device without performing the light amount correction function. The amount of light on the photosensitive drum surface means the actual amount of laser beam that is emitted from the laser and is then incident on the photosensitive drum through, for example, the fθ lens or the reflection mirror. Then, in general, correction profile data that allows the amount of light on the photosensitive drum surface to be uniform at any point is created. The correction profile data is stored in the light amount correction table A of the NVRAM 1314 in the light amount correction circuit.

A light amount correction DAC output voltage graph 3512 shown in FIG. 11 shows the operation result of the control unit 1313 on the basis of the stored data 3401, which is the correction profile data. Then, the same process as that in FIG. 10 is performed to obtain the light source laser beam amount 3403 shown in a light-amount-corrected light source laser beam amount graph 3513 after the amount of light is corrected and adjusted. In this way, the amount of light on the photosensitive drum surface 3404 becomes uniform in the main scanning direction as shown in a graph 3514 for the amount of light on the light-amount-corrected photosensitive drum surface. The density 3405 on the intermediate transfer belt becomes uniform in the main scanning direction as shown in a graph 3515 for density on a light-amount-corrected intermediate transfer belt.

Next, an example of the operation using the stored data 3401 in each of the light amount correction table A and the density deviation correction table A' will be described with reference to FIGS. 12 and 13. Here, the calculation of up to the DAC output voltage 3402 obtained by an operation with the stored data 3401 of each of the light amount correction table A and the density deviation correction table A' will be described. The subsequent process and the flow of the process are the same as described above.

Figure 12:
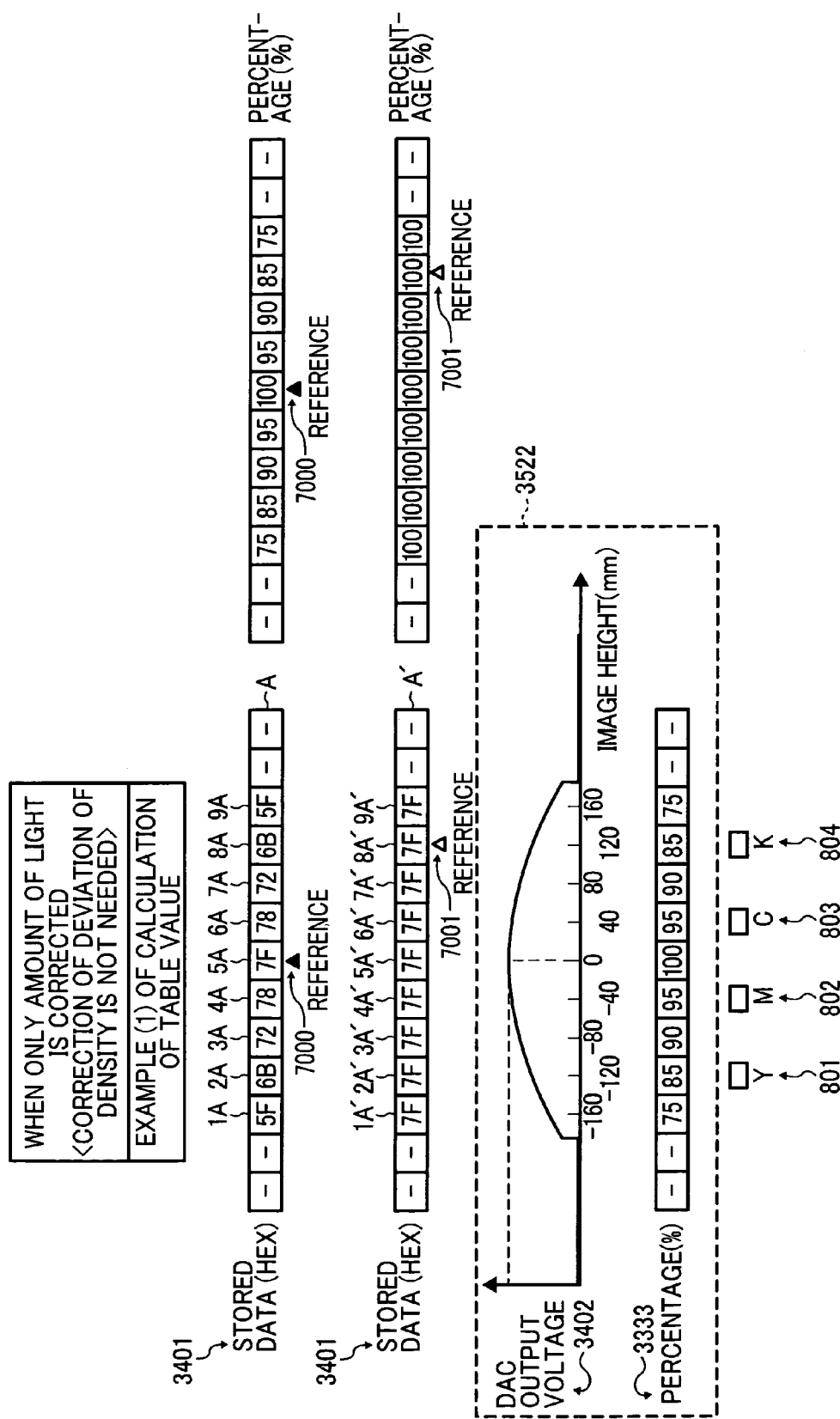
FIG. 12 is a diagram illustrating the calculation result when the amount of light is corrected and the deviation of density is not corrected.

FIG. 12 is a diagram illustrating the calculation result when the amount of light is corrected and the deviation of density is not corrected. In the light amount correction table A shown at the upper part of FIG. 12, a profile in which the stored data 3401 has 7Fh as the maximum value and 5Fh as the minimum value is formed. In the light amount correction table A, a position which has a central image height and corresponds to the area 5A is used as a reference 7000 in the light amount correction table A. As can be seen from the result which is shown on the upper right side of FIG. 12 and is expressed as a percentage (%), the profile has a convex shape. In contrast, in the density deviation table A' shown at the lower part of FIG. 12, a uniform profile in which the stored data 3401 has 7Fh as its center is formed. In the density correction table A', a position which corresponds to the position of the K optical density sensor 804 and corresponds to an area 8A' in FIG. 12 is used as a reference 7001 in the density correction table A'.

In this embodiment, the reference 7001 of the density correction table A' is disposed at the position of the K optical density sensor 804 and data represented by a percentage 3333 shown at the lower part of FIG. 12 is used to perform an operation. In this way, even when the deviation of density is corrected and adjusted in the main scanning direction, the stored data corresponding to the K optical density sensor 804 does not vary and the absolute value of the image density does not vary. In the operation, the profile data (maximum: 7Fh and minimum: 5Fh) of the table A is multiplied by the relative value (a value before it is expressed as a percentage, that is, a value obtained by dividing the value expressed as a percentage in FIG. 12 by 100) of the table A'. This operation is performed by the control unit 1313 shown in FIG. 5 and the operation result is input to the D/A converter 1315. A first DAC output voltage graph 3522 shows the DAC output voltage 3402. The percentage (%) 3333 at the lower part of the first DAC output voltage graph 3522 is the percentage (%) of the relative value of the DAC output voltage 3402 with respect to the value of the center area 5A.

Figure 13:
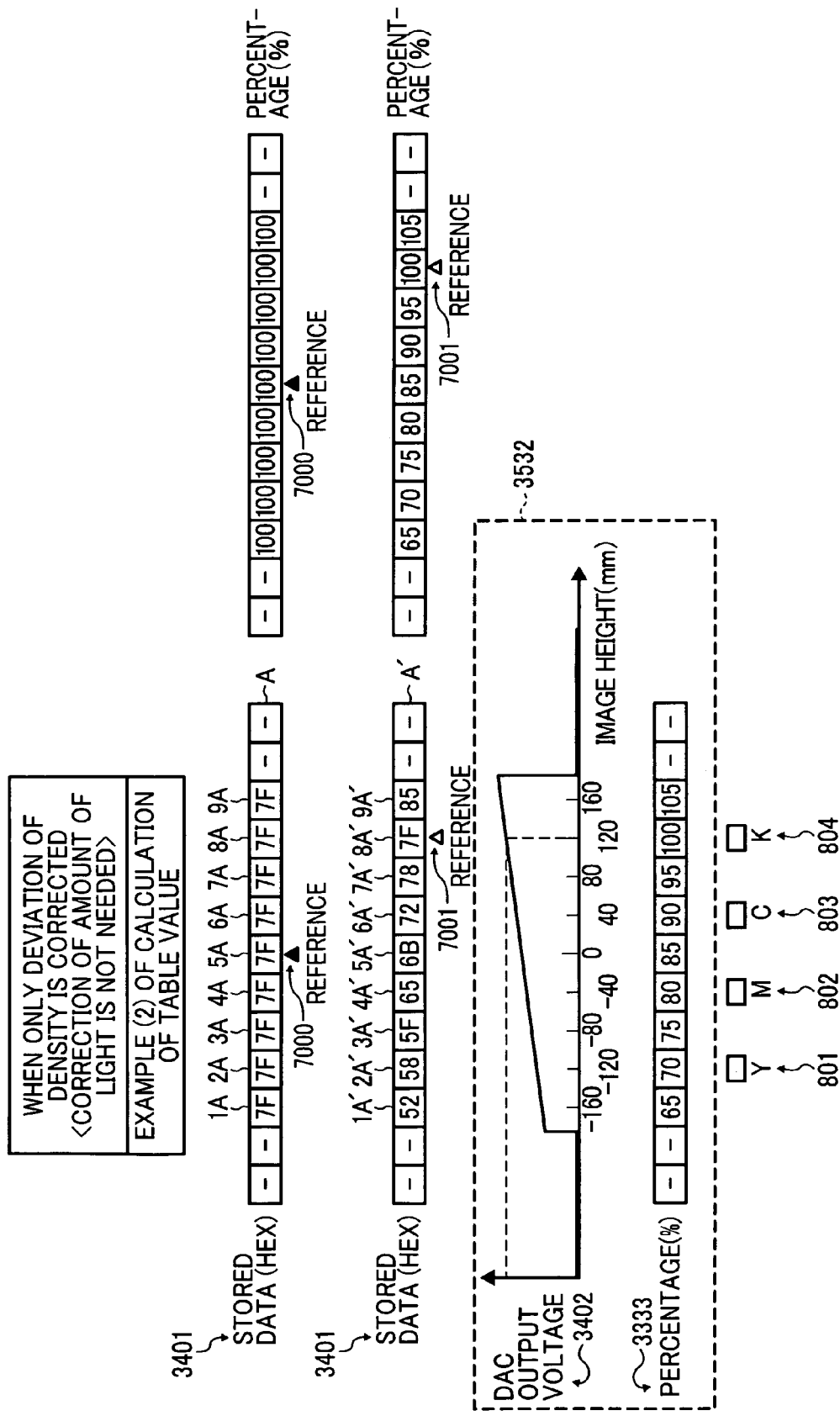
FIG. 13 is a diagram illustrating the calculation result when the amount of light is not corrected and the deviation of density is corrected.

FIG. 13 is a diagram illustrating the calculation result when the deviation of density is corrected and the amount of light is not corrected. In the light amount correction table A shown at the upper part of FIG. 13, a uniform profile in which the stored data 3401 is 7Fh is formed. In contrast, in the density deviation table A', a profile in which the stored data 3401 has 7Fh as the maximum value and 52h as the minimum value is formed. Thereafter, the same process as that in FIG. 12 is performed and a second DAC output voltage graph 3532 indicates the DAC output voltage 3402. The percentage (%) 3333 shown at the lower part of the second DAC output voltage graph 3532 is the percentage (%) of the relative value of the DAC output voltage 3402 with respect to the value of the right area 8A.

Figure 14:
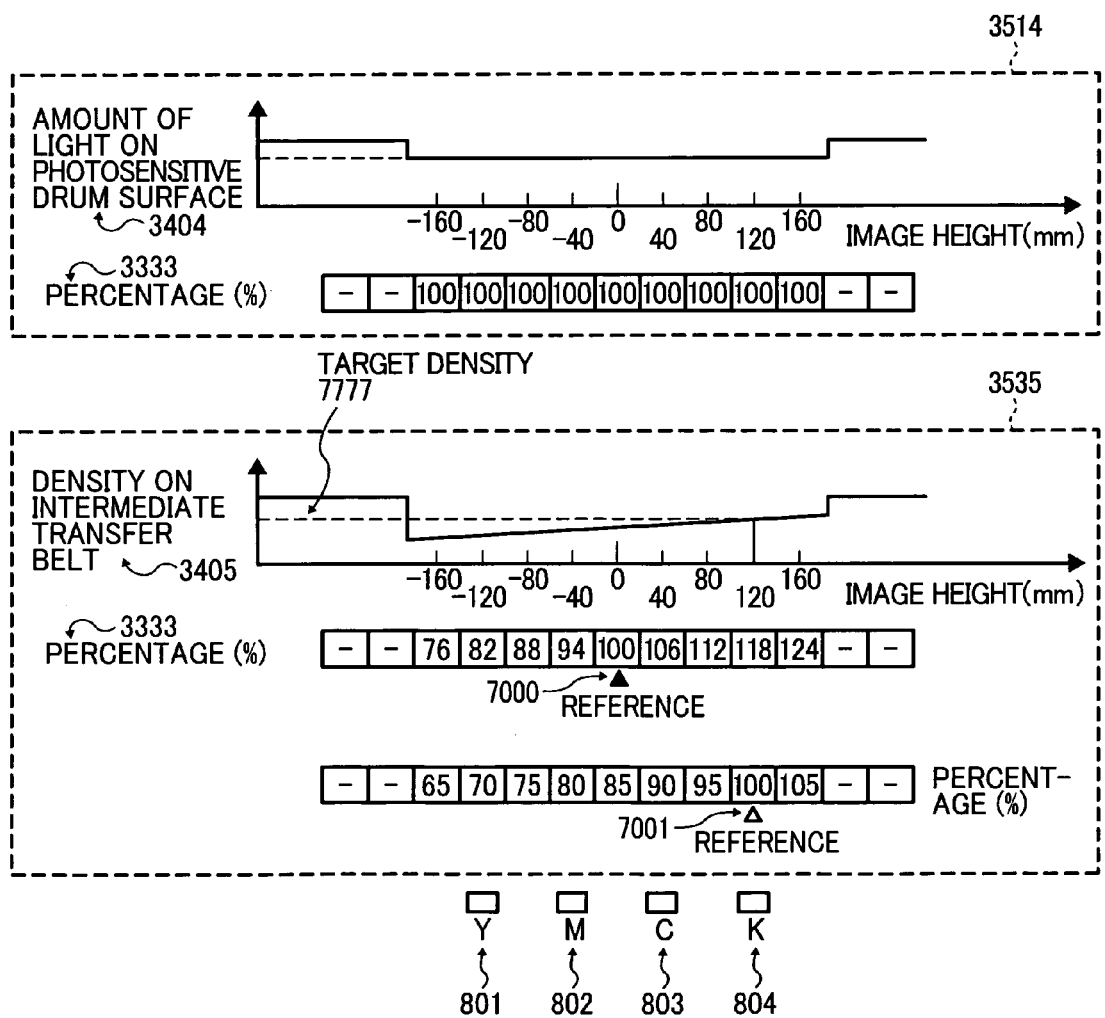
FIG. 14 is a diagram illustrating a case in which density needs to be corrected and adjusted.

FIG. 14 is a diagram illustrating a case in which density needs to be corrected and adjusted. The amount of light on the photosensitive drum surface 3404 after the correction and adjustment of the amount of light is shown in a graph 3514 for the amount of light on the photosensitive drum surface after the amount of light is corrected. However, unlike the situation shown in FIG. 11, the density 3405 on the intermediate transfer belt deviates in the main scanning direction (in the example shown in FIG. 14, the density is reduced toward the left side) due to various factors. For convenience of description, the density linearly varies in the main scanning direction. However, the density may not linearly vary in the main scanning direction. In addition, the position of each of the Y optical density sensor 801, the M optical density sensor 802, the C optical density sensor 803, and the K optical density sensor 804 in FIG. 14 corresponds to the area of each image height position (−120 mm, −40 mm, +40 mm, and +120 mm) in the main scanning direction. In this embodiment, the K optical density sensor 804 detects the density of toner on the intermediate transfer belt 10 and image density is corrected on the basis of the detection result. Specifically, the K optical density sensor 804 periodically detects the toner on the intermediate transfer belt 10, and image density is periodically adjusted to obtain target density 7777 on the basis of the detection result. In FIG. 14, the target density 7777 is also maintained at the position of the K optical density sensor 804.

In FIG. 14, the way of viewing a graph 3535 for density on the intermediate transfer belt and how the density deviation required to correct density deviation should be grasped are as follows. For example, the percentage 3333 at the upper part of the graph 3535 for density on the intermediate transfer belt is the percentage of the relative value with respect to a central image height of 0 mm, that is, the value of the reference 7000. The relative value is obtained by converting the value of the density of each area in the main scanning direction. In this case, the density of toner of an area at an image height of +120 mm is 118% relative to the reference 7000 and density deviation occurs. Therefore, the density deviation is adjusted from 118% to 100%. In this way, the density of toner of the area at an image height of +120 mm is reduced and the density deviation is removed. The density of toner at the end facing the K optical density sensor 804 is away from the target density 7777 (in the example shown in FIG. 14, the density of toner is reduced). As such, since the density of toner of the area at an image height of +120 mm is away from the target density after the density deviation is adjusted in the main scanning direction, it is necessary to adjust the density of toner of the area to be close to the target density 7777 and it takes the time to adjust the density of toner.

Therefore, attention is required to read the density of toner with the eyes or an image reading device, such as a scanner, convert density deviation into data, and store the converted data as a density deviation correction profile. In this embodiment, as shown in the percentage at the lower part of the graph 3535 for density on the intermediate transfer belt, the reference area of the data stored in the density correction table A' is used as the area of the reference 7001 in which a detector for adjusting density, such as the K optical density sensor 804, is provided, and data in the other areas is used as the relative value (which is expressed as a percentage in FIG. 14, for convenience of illustration) with respect to the data in the area of the reference 7001. The relative value of each area is used for the later operation.

Figure 15:
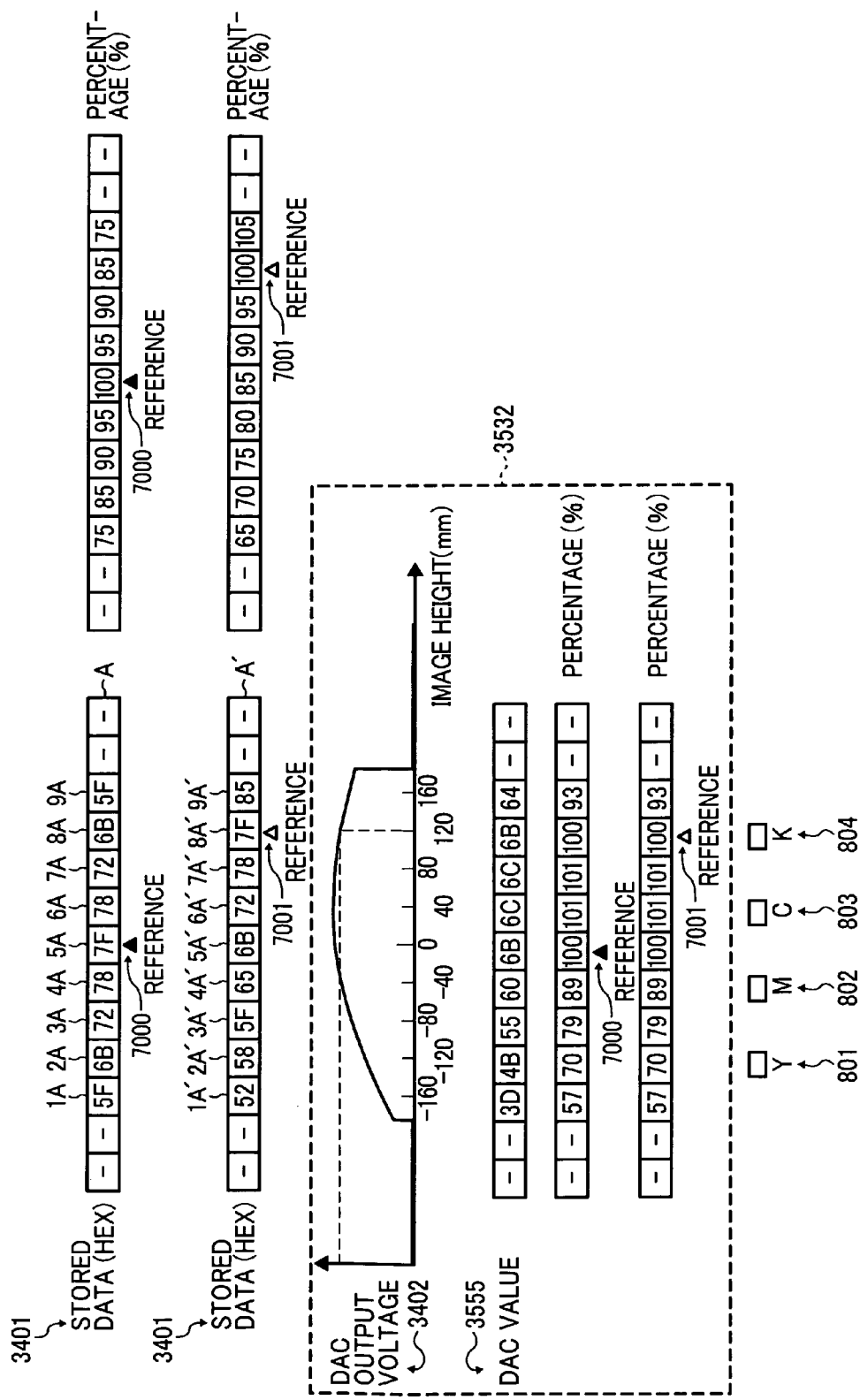
FIG. 15 is a diagram illustrating the state of the actual deviation of image density and an operation for removing the deviation of image density.

FIG. 15 is a diagram illustrating the actual deviation of image density and an operation for removing the deviation. In order to resolve the state of the graph 3535 for density on the intermediate transfer belt in FIG. 14, density is read by the eyes or an image reading device, such as a scanner; the deviation of the density is converted into data, and profile data is stored as a density deviation correction profile. In this case, the profile data is the density correction table A'. In contrast, the light amount correction table A is profile data that is stored in the NVRAM 1314 in the factory in advance. In FIG. 15, an actual DAC output voltage graph 3532 shows the results of the DAC output voltage 3402 and a DAC value 3555 obtained by multiplying the stored data 3401 in each of the areas 1A to 9A of the light amount correction table A by stored data (a relative value obtained by dividing the value expressed as a percentage by 100) in the corresponding areas of the density correction table A'. At the upper part of the DAC value 3555 in the actual DAC output voltage graph 3532, a DAC value is represented by a hexadecimal number. At the middle part of the DAC value 3555, the relative value of the actual DAC output voltage (decimal number) when the reference in the main scanning direction is disposed at a position 7000 with a central image height of 0 mm is represented by a percentage. At the lower part of the DAC value 3555, the relative value of the actual DAC output voltage (decimal number) when the reference in the main scanning direction is disposed at the position 7001 of the K optical density sensor 804 is represented by a percentage.

Figure 16:
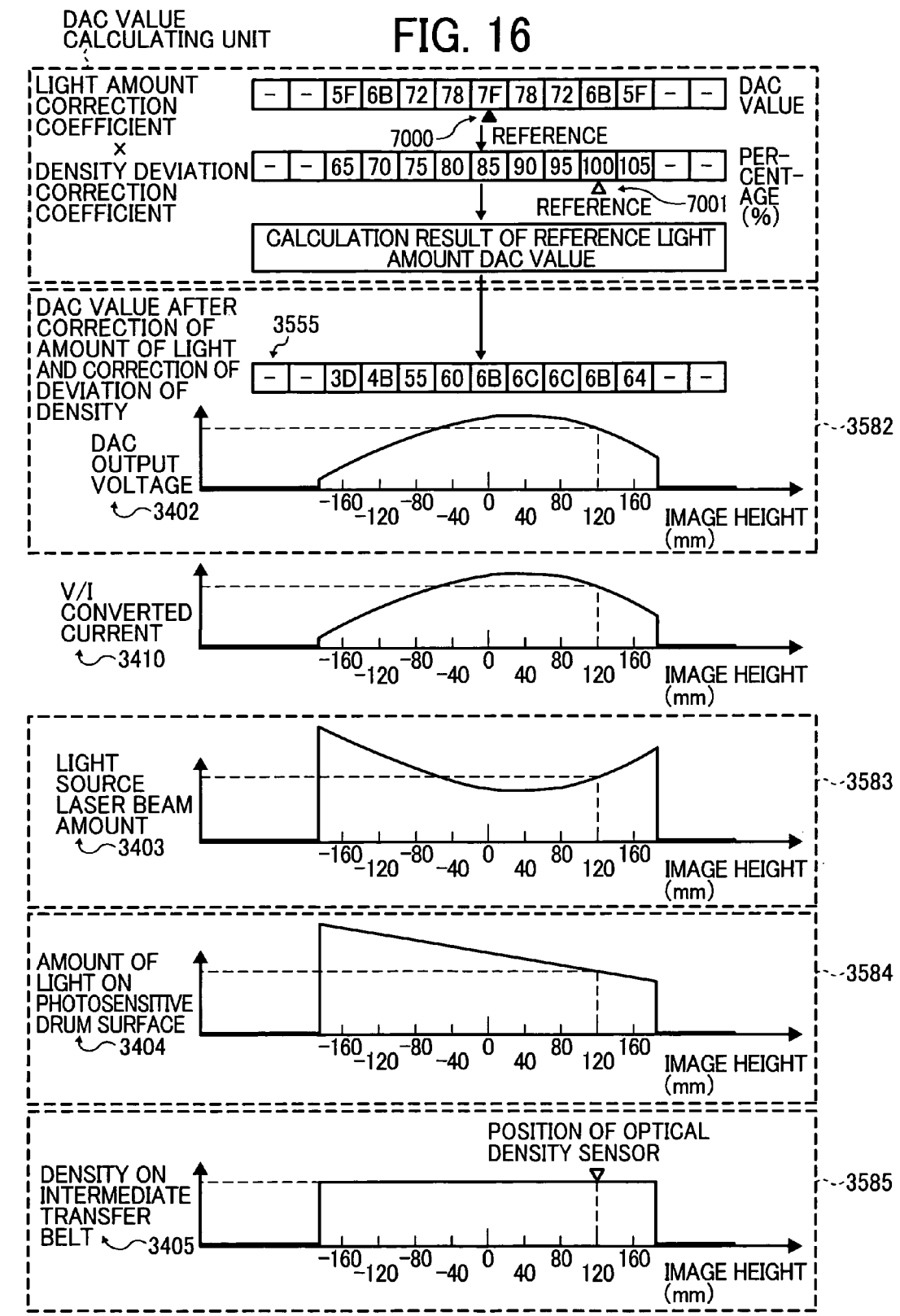
FIG. 16 is a diagram illustrating the flow of a process after the operation shown in FIG. 15 is performed.

FIG. 16 is a diagram illustrating the flow of a process after the operation is performed in FIG. 15. The calculation result of the DAC value 3555 that has been calculated by the DAC calculating unit and subjected to light amount correction and density correction in FIG. 15 is set to each area, and a series of processes shown in FIGS. 10 and 11 is performed. In this way, the laser driving current IL obtained by subtracting a V/I converted current 3410 shown in FIG. 16 from the set current Isum is supplied to the LD 1200, which is a light source, and the scanning laser beam amount 3403 and the amount 3404 of light on the photosensitive drum surface are as shown in the light source laser beam amount graph 3583 and the graph 3584 for the amount of light on the photosensitive drum surface in FIG. 16. The density 3405 on the intermediate transfer belt is in the state shown in a final intermediate transfer belt density graph 3585 in FIG. 16. As a result, the deviation of density in the main scanning direction is corrected without a variation in the absolute value of toner density at a position corresponding to the K optical density sensor 804.

Figure 17:
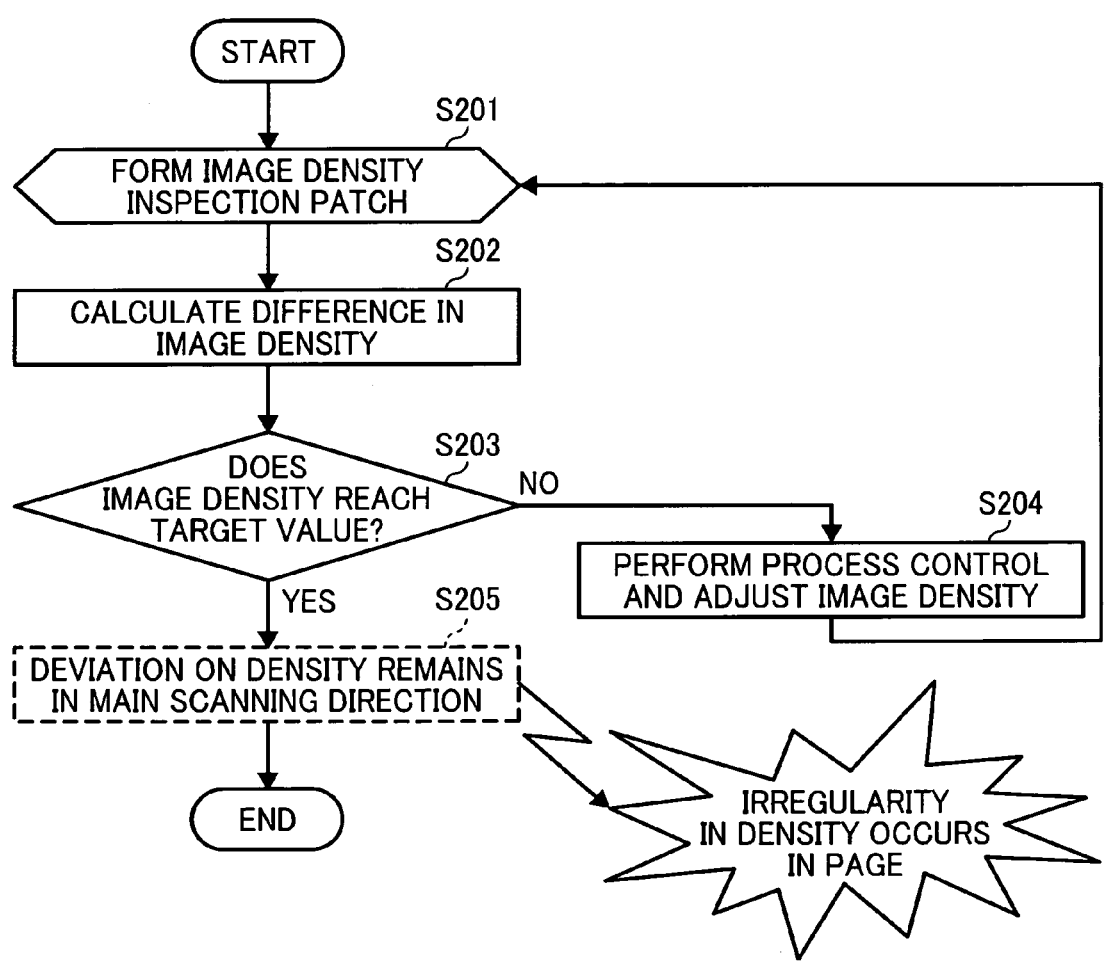
FIG. 17 is a flowchart illustrating an example of a density adjustment process according to the related art.

FIG. 17 is a flowchart illustrating an example of the flow of a density adjustment process according to the related art, which is a comparative example. In the comparative example, a reference toner image of an image density inspection patch is transferred to the intermediate transfer belt 10 and image density is detected (S201). The detection result of the image density is compared with a target value (S202). Process control and image density adjustment are performed until the density of the reference toner image reaches the target value (S203 and S204). As a result, even when the density of the reference toner image reaches the target value (Yes at S203), the deviation of density in the main scanning direction is not removed (S205), and irregularity in density occurs in the printed page.

Figure 18:
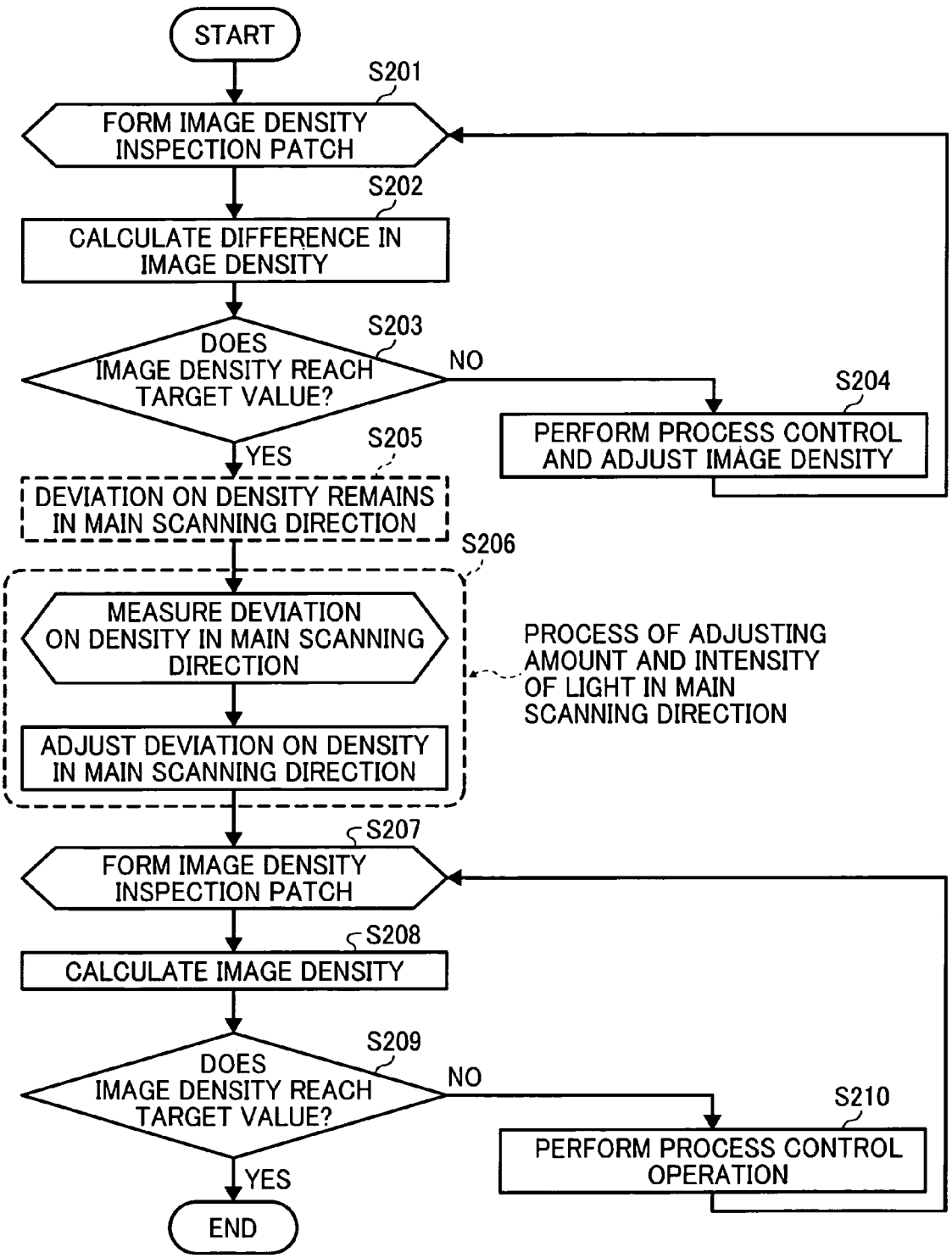
FIG. 18 is a flowchart illustrating another example of the density adjustment process according to the related art.

FIG. 18 is a flowchart illustrating another example of the flow of the density adjustment process according to the related art, which is a comparative example. In the comparative example, when the image density of a reference toner image reaches a target value (Yes at S203) and the deviation of density in the main scanning direction described in FIG. 17 remains (S205), a process of adjusting the amount and density of light in the main scanning direction according to the related art is performed in order to remove the deviation of density (S206). However, when the process of adjusting the amount and density of light in the main scanning direction according to the related art is performed, the adjustment of image density using the reference toner image of the image density inspection patch deviates and it is difficult to obtain predetermined image density. Therefore, as shown in FIG. 18, it is necessary to adjust image density again using the reference toner image of the image density inspection patch after the process of adjusting the amount and density of light in the main scanning direction is performed (S206). That is, after the process of adjusting the amount and density of light in the main scanning direction is performed (S206), it is necessary to perform the following steps until the density of the reference toner image reaches a target value: the reference toner image of the image density inspection patch is formed and the density of the reference toner image is detected (S207); the detection result of the density of the reference toner image is compared with the target value (S208); and process control and image density adjustment (S209 and S210) are performed on the basis of the comparison result.

Figure 19:
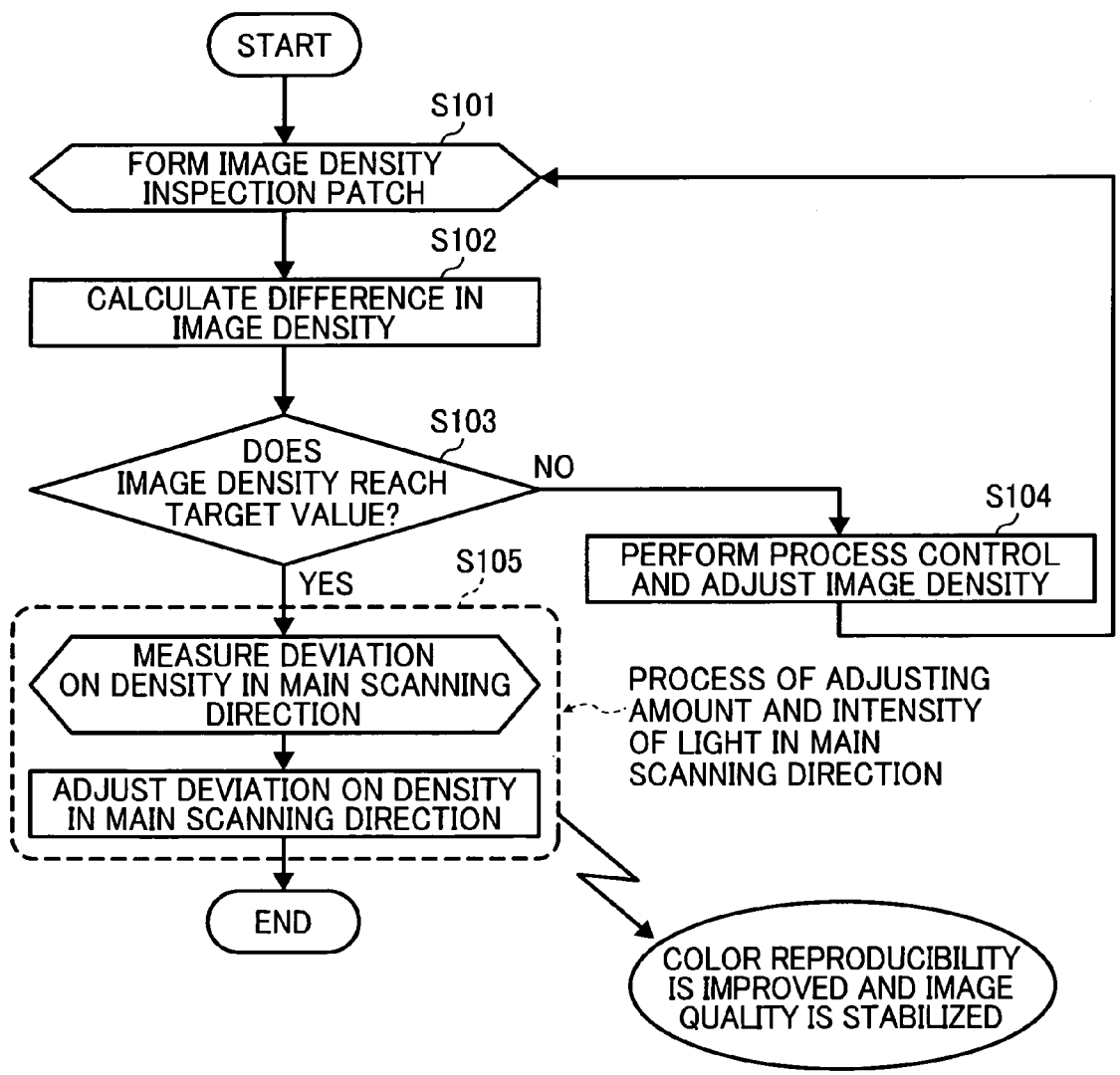
FIG. 19 is a flowchart illustrating an example of a density adjustment process according to this embodiment.

FIG. 19 is a flowchart illustrating an example of a density adjustment process according to this embodiment. In the density adjustment process according to this embodiment, as described above, an operation is performed using the reference 7001 of the density correction table A' as the position of the K optical density sensor 804. In this way, even when the deviation of density in the main scanning direction is adjusted, there is no variation in the stored data ("6Bh" in FIGS. 15 and 16) for the correction of the amount of light corresponding to the K optical density sensor 804 and the absolute value of image density (toner density) does not vary. Therefore, an improvement in image quality, such as a reduction in the deviation in print density in the main scanning direction, is obtained and a process of forming the reference toner image of the image density inspection patch and calculating image density after the process of adjusting the amount and intensity of light in the main scanning direction is performed is not needed.

Figure 20:
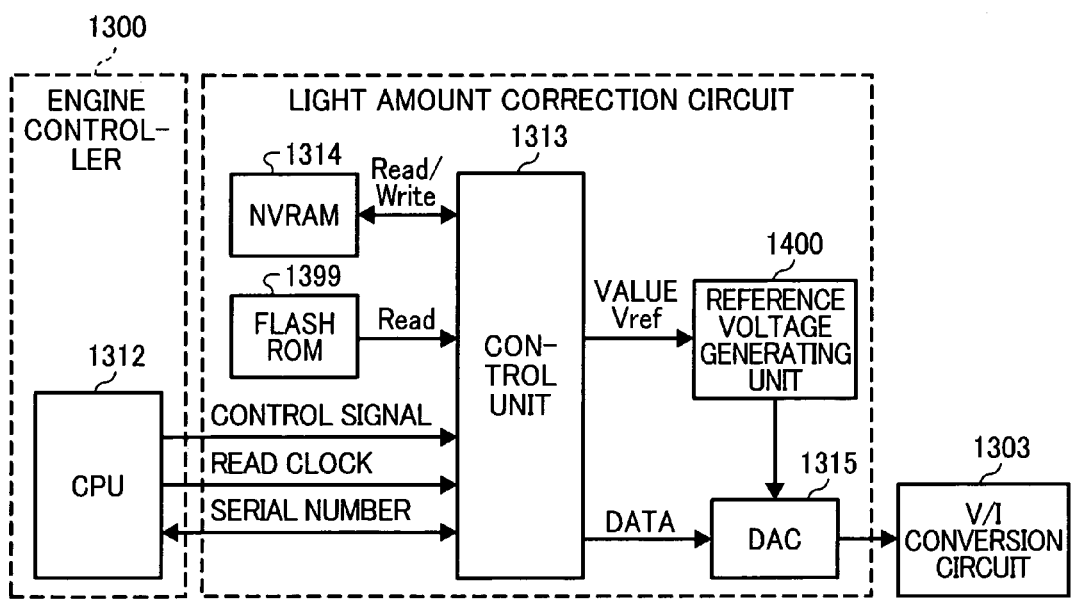
FIG. 20 is a block diagram schematically illustrating the structure of a light amount correction circuit according to another embodiment.

FIG. 20 is a block diagram schematically illustrating the structure of a light amount correction circuit according to another embodiment. In the example of FIG. 20, the light amount correction table A (see FIG. 5) in the NVRAM 1314 of the light amount correction circuit according to the above-described embodiment is ensured on a flash ROM 1399, which is a non-volatile memory serving as a second storage unit. The flash ROM 1399 can collectively rewrite some or all of the stored data. Data of a light amount correction profile, which is first light intensity adjustment data requiring a profile peculiar to an optical writing device 21, is stored in the light amount correction table A of the flash ROM 1399, and data of a density correction profile, which is second light intensity adjustment data, is stored in a density correction table A' in the NVRAM 1314. The flash ROM 1399 is configured so as to be attached to the optical writing device 21. When the optical writing device 21 is removed from the image forming apparatus body 100 for replacement, the flash ROM 1399 is also replaced. The light amount correction table A in the flash ROM 1399 is set in the factory in advance, as described above. In this way, it is possible to prevent numerical values in the table from being erroneously deleted or prevent the removal of the initial values due to the rewriting of data. In addition, even when the optical writing device 21 is replaced, it is not necessary to rewrite data in the NVRAM 1314 in which information for obtaining a necessary density deviation has already been stored.

According to each of the above-described embodiments, the first light intensity adjustment data for adjusting the intensity of light emitted from the optical writing device 21 such that the deviation of the emission intensity of light in the main scanning direction due to the characteristics of the optical writing device 21 is corrected is stored in the light amount correction table A. Separately from the first light intensity adjustment data, the second light intensity adjustment data for adjusting image density in the main scanning direction is stored in the density correction table A'. The second light intensity adjustment data can be set at each irradiation point in the main scanning direction in order to adjust the intensity of light emitted from the optical writing device 21 such that the deviation of image density at any irradiation point in the main scanning direction is corrected. The intensity of light emitted from the optical writing device 21 when scanning is performed with light in the main scanning direction is controlled on the basis of the first light intensity adjustment data and the second light intensity adjustment data for adjusting the intensity of light emitted from the optical writing device 21 such that the deviation of image density at any irradiation point in the main scanning direction is corrected. This control makes it possible to prevent the deviation of image density in the main scanning direction due to the deviation of the intensity of light emitted from the optical writing device 21 in the main scanning direction and arbitrarily adjust the deviation of image density in the main scanning direction.

The above-described embodiments include the optical density sensors 801 to 804 serving as image density detecting units that detect the density of the reference toner image formed on the surface of the intermediate transfer belt 10 at predetermined detection positions facing the surface of the intermediate transfer belt 10, and the main control unit 745 serving as a setting changing unit that changes the setting of image formation conditions such that the density of the reference toner image detected by the optical density sensors 801 to 804 has a predetermined value. The second light intensity adjustment data in the density correction table A' is set on the basis of points corresponding to the detection positions of the optical density sensors 801 to 804 (for example, the black optical density sensor 804). As such, since the second light intensity adjustment data is set at other points on the basis of the points corresponding to the detection positions of the optical density sensors 801 to 804, it is not necessary to control the adjustment of image density (process control) to change the setting of the image formation conditions of the image forming unit such that image density is adjusted on the basis of the detection result of the optical density sensors 801 to 804 after the setting of the second light intensity adjustment data in the density correction table A' is changed. That is, the time required to control the adjustment of image density (process control) using the detection result of the optical density sensors 801 to 804 is not needed.

According to the above-described embodiments, the first storage unit that stores the light amount correction table A including the first light intensity adjustment data is a read only memory (ROM). Therefore, it is possible to prevent the first light intensity adjustment data in the light amount correction table A from being erroneously deleted or prevent the removal of the initial values due to the rewriting of the first light intensity adjustment data.

According to the above-described embodiments, the first storage unit that stores the light amount correction table A including the first light intensity adjustment data is provided in the optical writing device 21. Therefore, when the optical writing device 21 is used in another image forming apparatus, it is possible to read the first light intensity adjustment data peculiar to the optical writing device 21 from the light amount correction table A in the optical writing device 21 and use the read first light intensity adjustment data.

According to the above-described embodiments, the second storage unit that stores the density correction table A' including the second light intensity adjustment data is a memory that can rewrite data. Therefore, it is possible to rewrite the second light intensity adjustment data in the light amount correction table A'.

According to the above-described embodiments, the data input unit, such as an operation panel serving as a data rewriting unit for rewriting the second light intensity adjustment data stored in the second storage unit, is provided. For example, the user of the image forming apparatus or the operator who maintains the image forming apparatus can operate the data input unit to arbitrarily rewrite the second light intensity adjustment data.

According to the above-described embodiments, the second storage unit that stores the density correction table A' including the second light intensity adjustment data is provided in the image forming apparatus body 100. Therefore, even when the optical writing device 21 is replaced, it is not necessary to rewrite the second light intensity adjustment data that has been stored in the second storage unit in the image forming apparatus body 100 in order to obtain a necessary image density deviation.

In the above-described embodiments, the setting of the second light intensity adjustment data in the density correction table A' may be limited such that the difference between the values of the second light intensity adjustment data at a plurality of points adjacent to each other in the main scanning direction is equal to or less than a predetermined value. For example, in the above-described embodiments, when the set value of the second light intensity adjustment data at the reference point (for example, the position of the reference 7001 in the actual DAC output voltage graph 3532 in FIG. 15) in the main scanning direction is 100, the difference between the values of the second light intensity adjustment data at a plurality of adjacent points is limited to be less than, for example, 15. For example, as shown in FIG. 21A, the value of the second light intensity adjustment data in each area is set to be equal to or more than 86 and equal to or less than 114 such that the difference between the set values of adjacent areas is not equal to or more than 15. That is, when an area number is n and an n-th light intensity adjustment data item is $a_n$, data in each area is set such that the difference $dA=a_n-a_{n-1}$ between the values of the light intensity adjustment data in adjacent areas is less than a predetermined determination reference value Nd ("15" in the example of FIG. 21A). Since the difference between the values of the second light intensity adjustment data at a plurality of adjacent points is limited in this way, it is possible to prevent a large difference between input values at adjacent points in the main scanning direction due to the input of an abnormal value (a value where the difference is 15 or more) caused by an artificial error in the input of a numerical value or an error in the detection of the reading device. Therefore, it is possible to prevent a large difference in density between adjacent points in the main scanning direction by changing the setting of the second light intensity adjustment data. FIG. 21B shows a comparative example in which the difference $dA=a_n-a_{n-1}$ between the set values of the light intensity adjustment data in adjacent areas is equal to or more than the determination reference value Nd ("15" in the example of FIG. 21B). In the comparative example, there is a concern that a change in the setting of the second light intensity adjustment data will cause a large difference in density between adjacent points in the main scanning direction.

Figure 22:
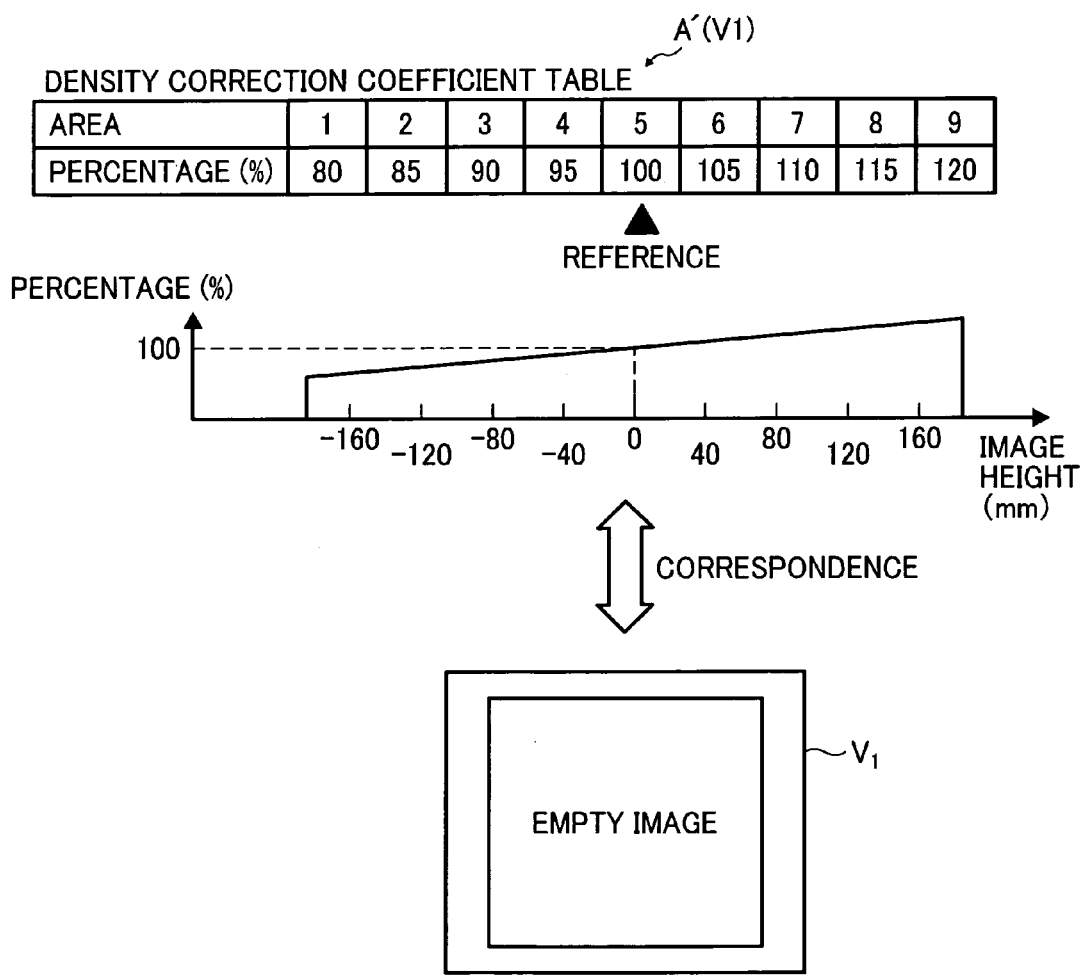
FIG. 22 is a diagram illustrating a density correction table associated with an image according to yet another embodiment.

In the above-described embodiments, the second light intensity adjustment data (density correction table A') stored in the second storage unit may be associated with an image that is formed using the second light intensity adjustment data (density correction table A'). For example, the density correction table A'(Vn) including the second light intensity adjustment data may be stored so as to be associated with identification information Vn (n=1, 2, ...) capable of identifying the kind of image formed by the image forming apparatus according to the above-described embodiment. In this case, when the same image forming apparatus that has been used to form (print) the image is used to form (print) an image, it is possible to use the second light intensity adjustment data of the density correction table A'(Vn) that has been previously used to form the image. Therefore, it is not necessary to adjust the deviation of image density again. For example, as shown in FIG. 22, the density correction table A'(V1) associated with an "empty" image V1 may be used to form (print) the "empty" image V1 again. In this way, it is possible to reduce the adjustment time required to obtain a desired print image.

In the above-described embodiments, plural kinds of second light intensity adjustment data may be stored in the image forming apparatus in advance such that they can be selected, and the intensity of light emitted from the optical writing unit may be controlled on the basis of the second light intensity adjustment data selected and read from the plural kinds of second light intensity adjustment data. For example, as shown in FIG. 23, a plurality of density correction tables A'(1) to A'(4) having four kinds of second light intensity adjustment data set therein is stored in the NVRAM 1314 in advance such that it can be selected. Plural kinds of different second light intensity adjustment data are set in the plurality of density correction tables A'(1) to A'(4). Any one of the density correction tables A'(1) to A'(4) may be selected and the deviation of image density in the main scanning direction may be corrected, on the basis of the state of the density of the image output from the image forming apparatus in the main scanning direction. The density correction table may be selected by the sense of the operator who views an output image. Alternatively, an image reading device, such as a scanner provided in the image forming apparatus, may read an output image and the density correction table may be selected on the basis of the read result (for example, the deviation of the density of the output image in the main scanning direction). In addition, an inspection device that inspects the quality of an output image may be provided separately from the image forming apparatus, and the density correction table A may be selected on the basis of the inspection result of the inspection device (for example, the deviation of the density of the output image in the main scanning direction).

The exemplary embodiments of the invention have been described above, but the invention is not limited to specific embodiments and the above-described embodiments. Various modifications and changes of the invention can be made without departing from the scope and spirit of the invention described in the claims.

In the invention, the first light intensity adjustment data for adjusting the intensity of light emitted from the optical writing unit such that the deviation of the emission intensity of the light in the main scanning direction due to the characteristics of the optical writing unit is corrected is stored. The second light intensity adjustment data is stored separately from the first light intensity adjustment data. The second light intensity adjustment data can be set at each irradiation point in the main scanning direction and is for adjusting the intensity of the light emitted from the optical writing unit such that the deviation of image density at any irradiation point in the main scanning direction is corrected. The intensity of the light emitted from the optical writing unit when the light is emitted in the main scanning direction is controlled on the basis of the first light intensity adjustment data and the second light intensity adjustment data for adjusting the intensity of the light emitted from the optical writing unit such that the deviation of image density at any irradiation point in the main scanning direction is corrected. This control operation makes it possible to prevent the deviation of image density in the main scanning direction due to the deviation of the intensity of light emitted from the optical writing unit in the main scanning direction and arbitrarily adjust the deviation of image density in the main scanning direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a latent image carrier having a surface that moves;
   an optical writing unit that scans and emits light in a main scanning direction at an intensity, the main scanning direction intersecting a direction in which the surface of the latent image carrier moves, thereby writing a latent image to the latent image carrier;
   a developing unit that develops the latent image of the latent image carrier;
   a first storage unit that stores first light intensity adjustment data for adjusting the intensity of light emitted from the optical writing unit such that a deviation of the intensity of the light in the main scanning direction due to characteristics of the optical writing unit is corrected;
   a second storage unit that stores, separately from the first light intensity adjustment data, second light intensity adjustment data which can be set at different irradiation points in the main scanning direction, the second light intensity adjustment data for adjusting the intensity of the light emitted from the optical writing unit such that the deviation of image density at each of the irradiation points in the main scanning direction is corrected;
   a control unit that controls the intensity of the light emitted from the optical writing unit when the light is emitted in the main scanning direction, on the basis of the first light intensity adjustment data stored in the first storage unit and the second light intensity adjustment data stored in the second storage unit;
   an image density detecting unit that detects the density of an image formed on the surface of the latent image carrier or the surface of a transfer body, to which the image is transferred from the latent image carrier, at a predetermined detection position facing the surface of the latent image carrier or the surface of the transfer body; and
   a setting changing unit that changes the setting of image formation conditions such that the density of the image detected by the image density detecting unit has a predetermined value, wherein
       the second light intensity adjustment data is set on the basis of a point corresponding to the detection position of the image density detecting unit.

2. The image forming apparatus according to claim 1, wherein the setting of the second light intensity adjustment data is limited such that a difference between the values of the second light intensity adjustment data at a plurality of points adjacent to each other in the main scanning direction is equal to or less than a predetermined value.

3. The image forming apparatus according to claim 1, wherein the first storage unit is a read only memory.

4. The image forming apparatus according claim 1, wherein the first storage unit is provided in the optical writing unit.

5. The image forming apparatus according to claim 1, wherein the second storage unit is a data rewritable memory.

6. The image forming apparatus according to claim 5, further comprising:
   a data rewriting unit that is used by a user of the image forming apparatus to rewrite the second light intensity adjustment data stored in the second storage unit.

7. The image forming apparatus according to claim 1, wherein the second storage unit is provided in an image forming apparatus body.

8. The image forming apparatus according to claim 1, wherein the second light intensity adjustment data stored in the second storage unit is associated with an image which is formed using the second light intensity adjustment data.

9. The image forming apparatus according to claim 1, wherein the second storage unit stores plural kinds of second light intensity adjustment data so as to be selected, and
   the control unit controls the intensity of the light emitted from the optical writing unit on the basis of the second light intensity adjustment data read and selected from the second storage unit.

10. An image forming apparatus comprising:
    a latent image carrier having a surface that moves;
    an optical writing unit configured to scan and emits light in a main scanning direction at an intensity determined based on a laser current, the main scanning direction intersecting a direction in which the surface of the latent image carrier moves, thereby writing a latent image to the latent image carrier;
    a developing unit that develops the latent image of the latent image carrier;
    an image density detecting unit configured to detect a density of the latent image formed on the surface of the latent image carrier at a plurality of areas distributed in the main scanning direction and generate a photocurrent that varies based on the detected density;
    a light amount correction circuit including,
        a non-volatile memory having a first storage unit and a second storage unit, the first storage unit configured to store first light intensity adjustment data for each of the plurality of areas and the second storage unit configured to store second light intensity adjustment data for each of the plurality of areas,
        a digital to analog converter configured to generate an intensity control voltage based on a reference voltage and the first light intensity adjustment data, the reference voltage based on a reference value, and
        a control unit configured to,
            determine, for each of the plurality of areas, which of the second light intensity adjustment data is the reference value, and
            vary the second light intensity adjustment data such that the density of the image formed on the latent image carrier is uniform between the plurality of areas, if the detected densities vary between the plurality of areas; and
    a current control unit configured to adjust the laser current based on the photocurrent and the intensity control voltage.

11. The image forming apparatus of claim 10, wherein the image density detecting unit includes a light emitting element configured to transmit light onto the plurality of areas of the surface of the latent image carrier and a light receiving element configured to generate the photocurrent based on specular and diffuse reflection elements of the transmitted light from the plurality of areas of the surface of the latent image carrier.

12. The image forming apparatus of claim 10, wherein the digital to analog converter is configured to generate the intensity control voltage such that the generated intensity control voltage has a voltage level equal to the reference voltage multiplied by the first light intensity adjustment data.

13. The image forming apparatus of claim 10, wherein the image density detecting unit is configured to detect the densities of the plurality of areas without forming and analyzing a preprogrammed reference toner image having a desired density distribution.

14. The image forming apparatus of claim 10, wherein the image forming apparatus includes a plurality of the image density detecting units each configured to detect an intensity of an associated color component of the latent image at the plurality of areas of the surface of the latent image carrier.

* * * * *